United States Patent
Maeda

(10) Patent No.: US 10,732,555 B2
(45) Date of Patent: Aug. 4, 2020

(54) IMAGE FORMING APPARATUS WITH MULTIPLE IMAGE FORMING DEVICES AND CONFIGURED TO CORRECT MISALIGNMENT OF SAME

(71) Applicant: Katsuhiko Maeda, Kanagawa (JP)

(72) Inventor: Katsuhiko Maeda, Kanagawa (JP)

(73) Assignee: Ricoh Company, Tokyo (JP)

(*) Notice: Subject to any disclaimer, the term of this patent is extended or adjusted under 35 U.S.C. 154(b) by 0 days.

(21) Appl. No.: 16/154,115

(22) Filed: Oct. 8, 2018

(65) Prior Publication Data

US 2019/0163109 A1    May 30, 2019

(30) Foreign Application Priority Data

Nov. 24, 2017    (JP) .................. 2017-226334

(51) Int. Cl.
*G03G 15/00* (2006.01)
*G03G 15/01* (2006.01)
*G03G 21/14* (2006.01)
*G06K 15/12* (2006.01)

(52) U.S. Cl.
CPC ..... *G03G 15/5058* (2013.01); *G03G 15/0131* (2013.01); *G03G 15/0189* (2013.01); *G03G 21/14* (2013.01); *G06K 15/1219* (2013.01); *G03G 2215/0129* (2013.01); *G03G 2215/0161* (2013.01); *G06K 15/129* (2013.01)

(58) Field of Classification Search
CPC ......... G03G 15/5058; G03G 2215/0158–0161
See application file for complete search history.

(56) References Cited

U.S. PATENT DOCUMENTS

| 2004/0070661 A1 | 4/2004 | Maeda |
| 2004/0095454 A1 | 5/2004 | Maeda |
| 2004/0160506 A1 | 8/2004 | Maeda |

(Continued)

FOREIGN PATENT DOCUMENTS

| JP | 2012-068429 | 4/2012 |
| JP | 2015-222389 | 12/2015 |

(Continued)

*Primary Examiner* — David M. Gray
*Assistant Examiner* — Andrew V Do
(74) *Attorney, Agent, or Firm* — Harness, Dickey & Pierce, P.L.C.

(57) ABSTRACT

An image forming apparatus includes image forming devices, image output devices, an endless conveyor, a transfer device, holders, a detector, and circuitry. The image forming devices include image bearers. The image output devices form latent images on the image bearers. The image forming devices form visible images from the latent images. The transfer device transfers the visible images onto the endless conveyor that conveys the visible images in an image conveyance direction. The holders hold the image forming devices interchangeable at holding positions aligned in the image conveyance direction. The detector detects the visible images. The circuitry compares a first visible image of the visible images formed at a specific holding position of the holding positions with a second visible image of the visible images formed at another holding position of the holding positions on the endless conveyor, to correct misalignment between the first and second visible images.

10 Claims, 15 Drawing Sheets

(56) References Cited

U.S. PATENT DOCUMENTS

| | | |
|---|---|---|
| 2004/0239747 A1 | 12/2004 | Maeda |
| 2005/0200689 A1 | 9/2005 | Shinohara et al. |
| 2006/0045577 A1 | 3/2006 | Maeda |
| 2006/0176363 A1 | 8/2006 | Maeda |
| 2007/0217831 A1 | 9/2007 | Maeda |
| 2008/0273902 A1 | 11/2008 | Maeda |
| 2011/0176842 A1* | 7/2011 | Fukamachi ........ G03G 15/0189 399/301 |
| 2014/0072317 A1 | 3/2014 | Shukuya et al. |
| 2017/0023888 A1* | 1/2017 | Shibasaki .......... G03G 15/1615 |

FOREIGN PATENT DOCUMENTS

| | | |
|---|---|---|
| JP | 2017-067845 | 4/2017 |
| JP | 2017-111240 | 6/2017 |

* cited by examiner

IMAGE FORMING APPARATUS WITH MULTIPLE IMAGE FORMING DEVICES AND CONFIGURED TO CORRECT MISALIGNMENT OF SAME

CROSS-REFERENCE TO RELATED APPLICATIONS

This patent application is based on and claims priority pursuant to 35 U.S.C. § 119(a) to Japanese Patent Application No. 2017-226334, filed on Nov. 24, 2017, in the Japan Patent Office, the entire disclosure of which is hereby incorporated by reference herein.

BACKGROUND

Technical Field

Embodiments of the present disclosure relates to an image forming apparatus for forming an image on a recording medium.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

Such image forming apparatuses often include a corrector to correct image misalignment based on a reference correction pattern.

SUMMARY

In one embodiment of the present disclosure, a novel image forming apparatus includes a plurality of image forming devices corresponding to a plurality of colors, a plurality of image output devices, an endless conveyor, a transfer device, a plurality of holders, a detector, and circuitry. The plurality of image forming devices includes a plurality of image bearers. The plurality of image output devices forms a plurality of latent pattern images on the plurality of image bearers. The plurality of image forming devices forms a plurality of visible pattern images from the plurality of latent pattern images. The transfer device transfers the plurality of visible pattern images from the plurality of image bearers onto the endless conveyor. The endless conveyor conveys the plurality of visible pattern images in an image conveyance direction. The plurality of holders holds the plurality of image forming devices interchangeable at a plurality of holding positions aligned in the image conveyance direction. The plurality of holding positions includes a specific holding position. The detector detects the plurality of visible pattern images on the endless conveyor. The circuitry compares a first visible pattern image of the plurality of visible pattern images with a second visible pattern image of the plurality of visible pattern images to correct misalignment between the first visible pattern image and the second visible pattern image. The first visible pattern image is formed by one of the plurality of image forming devices held at the specific holding position and transferred onto the endless conveyor. The second visible pattern image is formed by another one of the plurality of image forming devices held at another holding position of the plurality of holding positions and transferred onto the endless conveyor.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
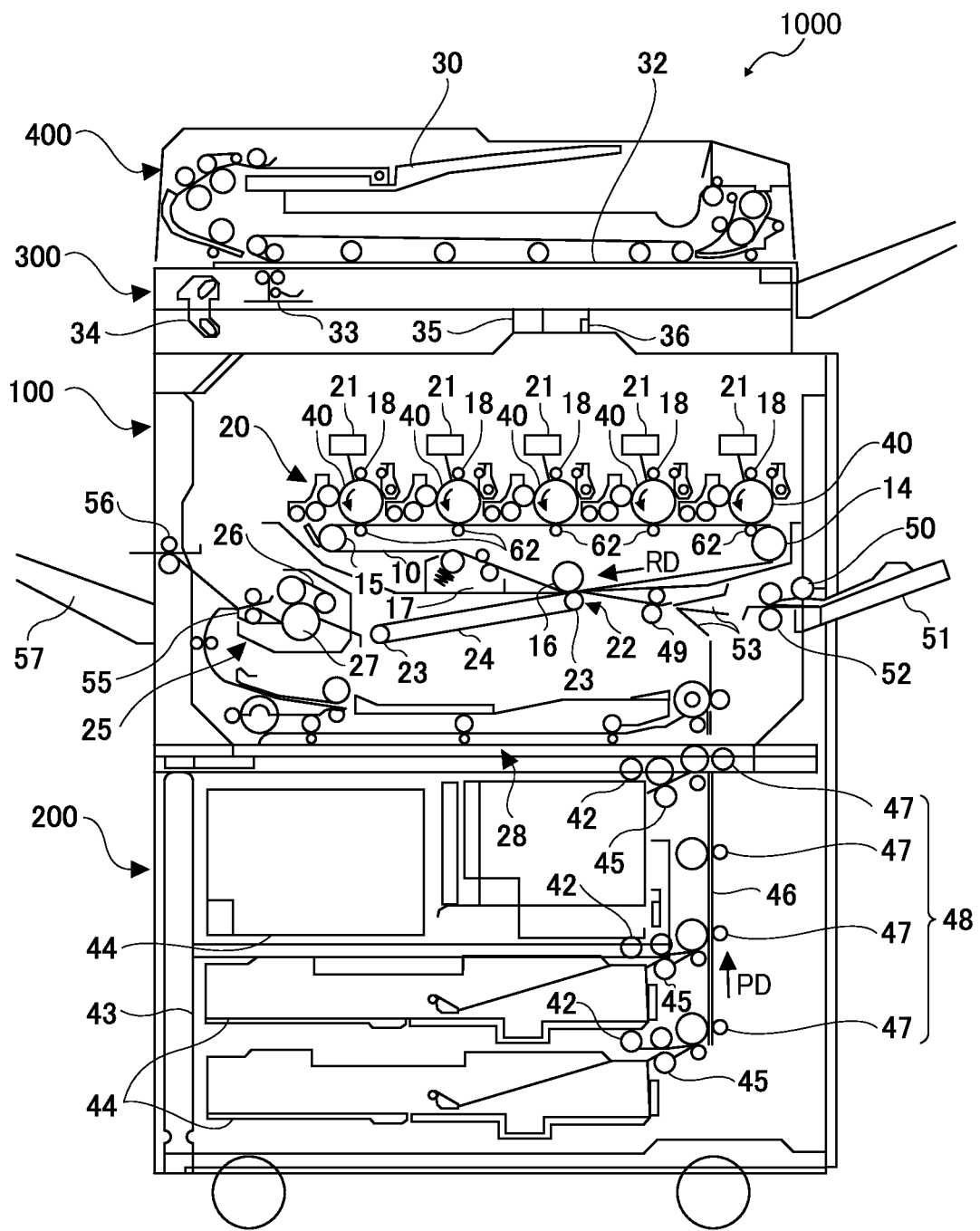
FIG. 1 is a schematic view of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes W, Y, M, C, and K denote colors white, yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

<Example of Image Forming Apparatus>

Initially with reference to FIG. 1, a description is given of an overall configuration of an image forming apparatus 1000 according to an embodiment of the present disclosure.

FIG. 1 is a schematic view of the image forming apparatus 1000.

The image forming apparatus 1000 is herein an electrophotographic, tandem image forming apparatus employing a secondary transfer mechanism to form a color image on a recording medium. The image forming apparatus 1000 may be a copier, a facsimile machine, a printer, a multifunction peripheral (MFP) having at least two of copying, printing, scanning, facsimile, and plotter functions, or the like.

As illustrated in FIG. 1, the image forming apparatus 1000 includes an image forming unit 100, a sheet feeding table 200, an image reading unit 300, and an automatic document feeder (ADF) 400.

The image forming unit 100 includes, e.g., an intermediate transfer unit. The intermediate transfer unit has an endless intermediate transfer belt 10 serving as an endless conveyor to convey an image. The intermediate transfer belt 10 is entrained around three support rollers, namely, a first support roller 14, a second support roller 15, and a third support roller 16. The intermediate transfer belt 10 rotates in a clockwise direction.

An intermediate transferor cleaner 17 removes residual toner from an outer circumferential surface of the intermediate transfer belt 10 after an imaging process. The residual toner is herein toner that has failed to be transferred onto a recording medium P and therefore remains on the outer circumferential surface of the intermediate transfer belt 10.

Figure 2:
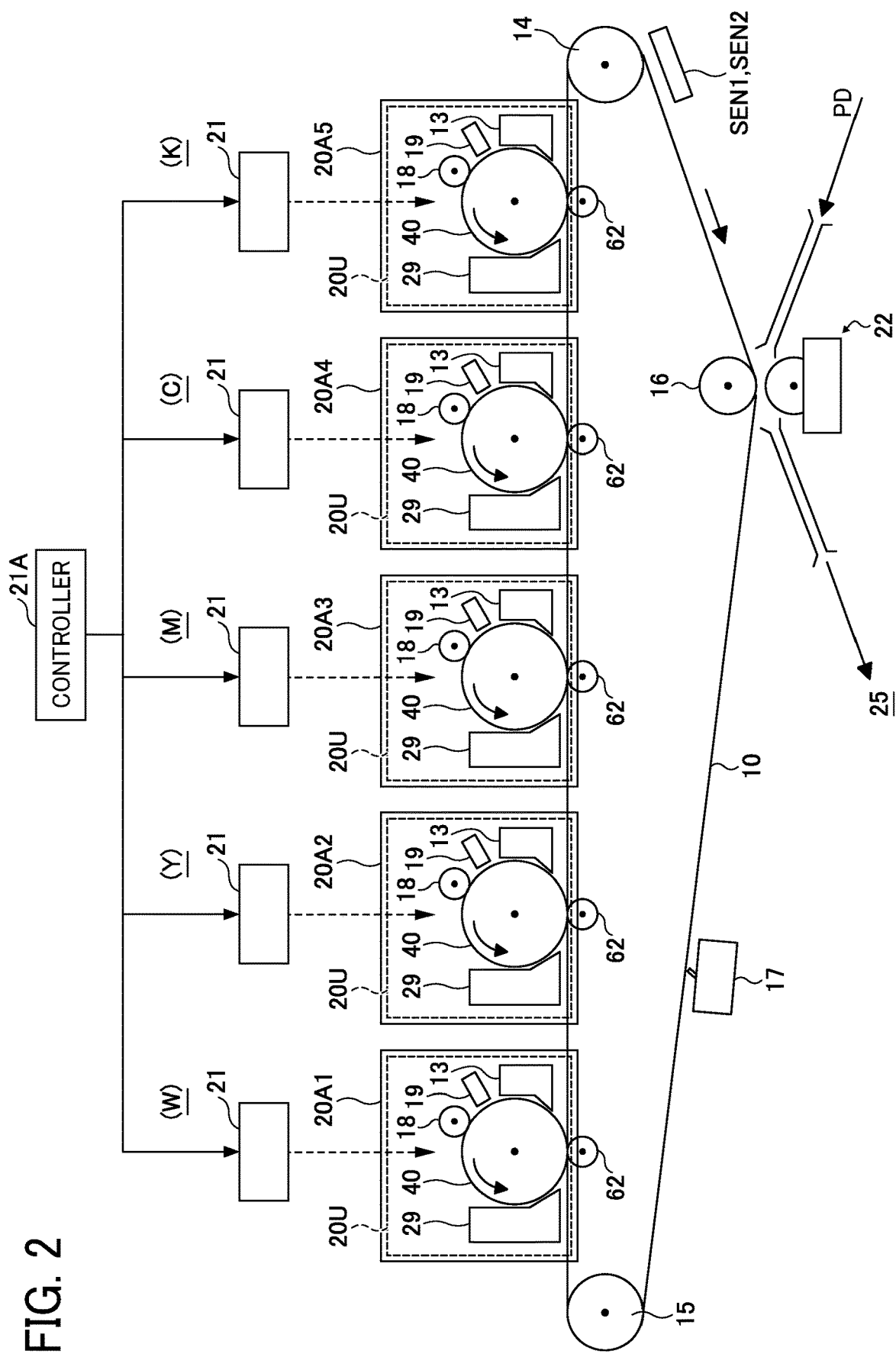
FIG. 2 is a schematic view of a first example of an imaging device incorporated in the image forming apparatus of FIG. 1.
Figure 3:
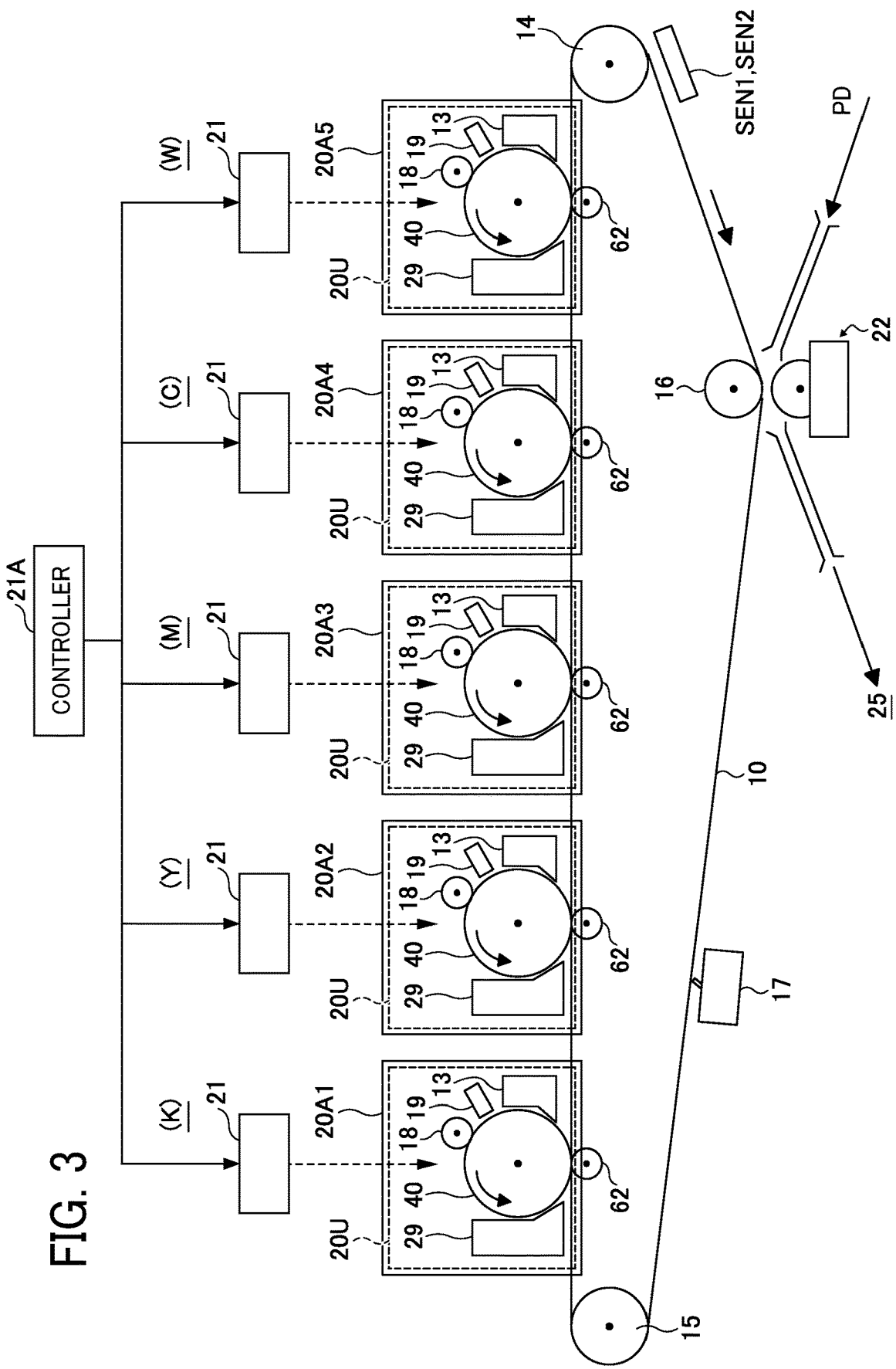
FIG. 3 is a schematic view of a second example of the imaging device incorporated in the image forming apparatus of FIG. 1.

The image forming unit 100 includes an imaging device 20 to form images of, e.g., white (W), yellow (Y), magenta (M), cyan (C), and black (K). The imaging device 20 includes an imaging unit 20U for each color. In other words, the imaging device 20 herein includes five imaging units 20U for white (W), yellow (Y), magenta (M), cyan (C), and black (K). Each of the imaging units 20U includes a cleaner 13, a charger 18, a discharger 19, a developing device 29, and a photoconductor 40. Note that FIGS. 2 and 3 illustrate the cleaner 13, the discharger 19, the developing device 29, and the imaging unit 20U.

The five imaging units 20U of the imaging device 20 are aligned between the first support roller 14 and the second support roller 15. Specifically, the five imaging units 20U of the imaging device 20 are aligned in the order of white (W), yellow (Y), magenta (M), cyan (C), and black (K) in a direction of rotation of the intermediate transfer belt 10 (hereinafter referred to as a rotation direction RD). The five imaging units 20U are detachably held by five holders 20A1 to 20A5 (illustrated in FIG. 2), respectively. That is, the five holders 20A1 to 20A5 are disposed for the five colors. A detailed description of the five imaging units 20U and the five holders 20A1 to 20A5 is deferred.

A light beam scanner 21 irradiates the photoconductor 40 (e.g., photoconductive drum unit) with a laser beam L serving as laser light, to form an electrostatic latent image on the photoconductor 40. The light beam scanner 21 herein serves as an image output device.

A secondary transfer unit 22 includes two rollers 23 and a secondary transfer belt 24. The secondary transfer unit 22 herein serves as a secondary transfer device.

The secondary transfer belt 24 is an endless belt entrained around the two rollers 23 to rotate. The two rollers 23 and the secondary transfer belt 24 are disposed so as to press up the intermediate transfer belt 10 against the third support roller 16.

The secondary transfer unit 22 transfers an image from the intermediate transfer belt 10 onto a recording medium P that is sandwiched between the intermediate transfer belt 10 and the secondary transfer belt 24. The recording medium P is, e.g., a plastic sheet or paper.

A fixing device 25 receives the recording medium P bearing an image transferred from the intermediate transfer belt 10. Then, the fixing device 25 fixes the image onto the recording medium P under heat. The fixing device 25 includes, e.g., a fixing belt 26 and a pressure roller 27. The fixing belt 26 is an endless belt. The fixing belt 26 and the pressure roller 27 are disposed such that the pressure roller 27 is pressed against the fixing belt 26.

A sheet reversing unit 28 receives the recording medium P and turns the recording medium P upside down for duplex printing. Specifically, after an image is formed on a front side of the recording medium P, the recording medium P is sent to the sheet reversing unit 28 so that another image is formed on a back side of the recording medium P.

The ADF 400 conveys a recording medium P from a sheet table 30 onto an exposure glass 32 when a start button is pressed on an operation panel. When no recording medium P is present on the sheet table 30, the ADF 400 activates and causes the image reading unit 300 to read the recording medium P placed by, e.g., a user, on the exposure glass 32.

The image reading unit 300 includes a first carriage 33, a second carriage 34, an imaging lens 35, a charge-coupled device (CCD) 36, and a light source.

The image reading unit 300 operates the first carriage 33 and the second carriage 34 to read the recording medium P on the exposure glass 32.

A light source of the first carriage 33 emits light toward the exposure glass 32. The light from the light source of the first carriage 33 is reflected by the recording medium P on the exposure glass 32 toward a first mirror on the first carriage 33. The first mirror reflects the light toward the second carriage 34. The light reflected by the second carriage 34 is focused on the CCD 36, serving as a reading sensor, through the imaging lens 35.

According to data acquired from the CCD 36, the image forming unit 100 generates image data of each color, that is, W, Y, M, C, and K.

The image forming unit 100 starts rotating the intermediate transfer belt 10 when the start button is pressed on the operation panel, when the image forming apparatus 1000 receives an image forming instruction from an external device such as a personal computer (PC), or in response to a facsimile output instruction, for example.

As the intermediate transfer belt 10 starts rotation, the imaging device 20 starts the imaging process. The fixing device 25 receives a recording medium P bearing a toner image, and fixes the image on the recording medium P. Thus, the image is formed on the recording medium P.

The sheet feeding table 200 includes a sheet feeding unit 43 and a conveyance roller unit 48. The sheet feeding unit 43 includes a plurality of sheet trays 44. Each of the plurality of sheet trays 44 is provided with a sheet feeding roller 42 and a separation roller 45. The conveyance roller unit 48 includes a plurality of conveyance rollers 47.

In the sheet feeding table 200, one of the plurality of sheet trays 44 included in the sheet feeding unit 43 is selected. The sheet feeding roller 42 provided for the selected sheet tray 44 is rotated to feed a recording medium P from the selected sheet tray 44. The separation roller 45 separates the recording medium P from other recording media P resting on the selected sheet tray 44 to send the recording medium P to a conveyance path 46. The plurality of conveyance rollers 47 conveys the recording medium P to the image forming unit 100 along the conveyance path 46 in a recording medium conveyance direction PD.

In the image forming unit 100, the recording medium P is conveyed to a registration roller pair 49 along a conveyance path 53. The recording medium P abuts against the registration roller pair 49, which temporarily stops the recording medium P. Activation of the registration roller pair 49 is timed to send out the recording medium P to the secondary transfer unit 22 such that the recording medium P meets a toner image conveyed on the intermediate transfer belt 10 at a secondary transfer area between the intermediate transfer belt 10 and the secondary transfer unit 22.

Note that one or more recording media P may be placed on a bypass tray 51 serving as a manual feeder. In a case in which one or more recording media P are placed on the bypass tray 51, a sheet feeding roller 50 rotates to import the recording media P one at a time into the image forming unit 100. Specifically, the sheet feeding roller 50 rotates to separate a recording medium P from other recording media P resting on the bypass tray 51. The sheet feeding roller 50 sends the recording medium P thus separated to the conveyance path 53 via a roller pair 52. The recording medium P is conveyed to the registration roller pair 49 along the conveyance path 53. Thereafter, the recording medium P is processed as in the case in which the recording medium P is sent from the sheet feeding table 200, for example. That is, as described above, the registration roller pair 49 temporarily stops the recording medium P and sends out the recording medium P to the secondary transfer unit 22 such that the recording medium P meets the toner image at the secondary transfer area.

The secondary transfer unit 22 transfers the toner image from the intermediate transfer belt 10 onto the recording medium P. The recording medium P bearing the toner image is then conveyed to the fixing device 25, which fixes the toner image onto the recording medium P. The fixing device 25 outputs the recording medium P, via a switching claw 55, to an output roller 56, for example. The output roller 56 receives and outputs the recording medium P onto an output tray 57. Thus, the recording medium P is ejected from the image forming unit 100.

Alternatively, the fixing device 25 may output the recording medium P, via the switching claw 55, to the sheet reversing unit 28. The sheet reversing unit 28 receives the recording medium P and turns the recording medium P upside down for duplex printing. Similarly to image formation on the front side of the recording medium P, another image is formed on the back side of the recording medium P. The recording medium P bearing the images on both sides is consequently output on the output tray 57.

As described above, the intermediate transferor cleaner 17 removes the residual toner from the intermediate transfer belt 10. After the residual toner is removed from the intermediate transfer belt 10, the image forming unit 100 performs the next image formation.

<Example of Image Forming Device>

Referring now to FIG. 2, a description is given of a configuration of the imaging device 20 incorporated in the image forming apparatus 1000 described above.

FIG. 2 is a schematic view of a first example of the imaging device 20.

The imaging device 20 includes, e.g., the intermediate transfer belt 10, the intermediate transferor cleaner 17, and the secondary transfer unit 22. The imaging device 20 further includes the five light beam scanners 21, the five imaging units 20U, and a controller 21A. The imaging units 20U herein serve as image forming devices.

As described above, each of the imaging units 20U includes the cleaner 13, the charger 18, the discharger 19, the developing device 29, and the photoconductor 40. The cleaner 13, the charger 18, the discharger 19, and the developing device 29 are arranged along an outer circumferential surface of the photoconductor 40 having a cylindrical shape.

In addition, the five imaging units 20U are held by the five holders 20A1 to 20A5, respectively. The five holders 20A1 to 20A5 are aligned in this order, from an upstream side to a downstream side, in the rotation direction RD, serving as an image conveyance direction, of the intermediate transfer belt 10. That is, in the present example of FIG. 2, the five holders 20A1 to 20A5 hold the five imaging units 20U of white (W), yellow (Y), magenta (M), cyan (C), and black (K), respectively. FIG. 2 illustrates an example of holding positions at which the five holders 20A1 to 20A5 respectively hold the five imaging units 20U.

Each of the five holders 20A1 to 20A5 is, e.g., a rail or a casing extending in an axial direction of the photoconductor 40, that is, a direction perpendicular to the surface of paper on which FIG. 2 is drawn. Like toner cartridges and the like, by drawing the five imaging units 20U from the five holders 20A1 to 20A5, the five imaging units 20U are individually removable from the five holders 20A1 to 20A5. On the other hand, by inserting the five imaging units 20U into the five holders 20A1 to 20A5, the five imaging units 20U are individually attachable to the five holders 20A1 to 20A5.

That is, the five imaging units 20U differing in colors employed are interchangeable in the rotation direction RD of the intermediate transfer belt 10. In other words, the order in which the five imaging units 20U are aligned is changeable. For example, two of the five imaging units 20U are exchanged by manually drawing the two imaging units 20U from the respective holders (i.e., two of the five holders 20A1 to 20A5) and switching each of the two imaging units 20U into the holder of the other.

The controller 21A generally controls the five light beam scanners 21 according to image data. The controller 21A has a function of correcting image misalignment based on the positions of correction patterns detected by a first sensor SEN1 and a second sensor SEN2. The controller 21A is implemented by a computer such as an integrated circuit (IC) chip. The controller 21A herein serves as a corrector. The controller 21A calculates and corrects image misalignment, for example, as described below.

The imaging device 20 superimposes images of a plurality of colors, in this case, five colors, one atop another on the intermediate transfer belt 10, thereby forming a color image. In other words, the imaging device 20 performs the imaging process. Specifically, an electrophotographic image forming process includes five processes, namely, a charging process, an exposure process, a developing process, a transfer process, and a fixing process. The imaging process includes, e.g., the charging, exposure, developing and transfer processes of the five processes.

As described above, the photoconductor 40 is surrounded by the cleaner 13, the charger 18, the discharger 19, and the developing device 29.

The charger 18 performs the charging process. Note that the charging process is herein a process in which the charger 18 charges the surface of the photoconductor 40.

The light beam scanner 21 performs the exposure process. Note that the exposure process is herein a process in which the light beam scanner 21 irradiates the surface of the photoconductor 40 with the light beam L to form an electrostatic latent image on the surface of the photoconductor 40. Specifically, the light beam scanner 21 irradiates the surface of the photoconductor 40 with the light beam L modulated according to image data, thereby forming an electrostatic latent image on the surface of the photoconductor 40.

The developing device 29 performs the developing process. Note that the developing process is herein a process in which the developing device 29 attaches toner to the electrostatic latent image formed on the photoconductor 40, rendering the electrostatic latent image visible as a toner image. Thus, the developing device 29 forms a toner image (i.e., visible image) on the photoconductor 40. The developing device 29 is supplied with toner from a toner bottle.

The developing device 29 includes a developing roller. The developing roller attaches toner to the photoconductor 40 in the developing process. Therefore, when the developing roller stops or decelerates, the developing device 29 outputs a reduced amount of toner.

A transfer roller 62, serving as a primary transfer device, performs the transfer process. Note that the transfer process is herein a process in which the transfer roller 62 transfers the toner image from the photoconductor 40 onto the intermediate transfer belt 10. Specifically, five color toner images are superimposed one top another on the intermediate transfer belt 10 to form a composite toner image on the intermediate transfer belt 10. Note that, after the transfer process, the cleaner 13 cleans the surface of the photoconductor 40. Then, the discharger 19 discharges the surface of the photoconductor 40.

The intermediate transfer belt 10 bearing the composite toner image rotates to convey the composite toner image to the secondary transfer unit 22. Meanwhile, the recording medium P is sent to the secondary transfer unit 22 such that the recording medium P meets the composite toner image at the secondary transfer area between the intermediate transfer belt 10 and the secondary transfer unit 22. The secondary transfer unit 22 transfers the composite toner image from the intermediate transfer belt 10 on the recording medium P at the secondary transfer area.

In other words, the secondary transfer unit 22 transfers the five color toner images constructing the composite toner image from the intermediate transfer belt 10 onto the recording medium P. Thereafter, the fixing device 25 performs the fixing process. Note that the fixing process is herein a process in which the fixing device 25 fixes the toner image onto the recording medium P. Through the above-described processes up to the fixing process, the image is formed on the recording medium P. After the composite toner image is transferred from the intermediate transfer belt 10 onto the recording medium P, the intermediate transferor cleaner 17 removes the residual toner of the five color toner images from the outer circumferential surface of the intermediate transfer belt 10.

The first sensor SEN1 and the second sensor SEN2 are disposed for misalignment correction, for example. The first sensor SEN1 and the second sensor SEN2 are, e.g., reflective optical sensors. Specifically, each of the first sensor SEN1 and the second sensor SEN2 detects a pattern having a given shape (hereinafter referred to as a "correction pattern") formed on the intermediate transfer belt 10, for misalignment correction, for example. Thus, the first sensor SEN1 and the second sensor SEN2 serve as detectors. Based on the detection result, the misalignment is corrected in a main scanning direction and a sub-scanning direction for each color. Note that, e.g., magnification in the main scanning direction may be corrected based on the detection result.

Referring now to FIG. 3, a description is given of another configuration of the imaging device 20 incorporated in the image forming apparatus 1000 described above.

FIG. 3 is a schematic view of a second example of the imaging device 20.

In FIG. 3, the imaging units 20U for white (W) and black (K) are interchanged. In other words, exchanging the positions of the imaging units 20U for white (W) and black (K) illustrated in FIG. 2 results in the relative positions of the imaging units 20U illustrated in FIG. 3. Specifically, in FIG. 2, the holder 20A5 holds the imaging unit 20U for black (K); whereas the holder 20A1 holds the imaging unit 20U for white (W). By contrast, in FIG. 3, the holder 20A1 holds the imaging unit 20U for black (K); whereas the holder 20A5 holds the imaging unit 20U for white (W).

The holder 20A5 is located at a most downstream position of the five holding positions in the rotation direction RD of the intermediate transfer belt 10. Therefore, the imaging unit 20U positioned at the holder 20A5 forms, on the intermediate transfer belt 10, a background color (i.e., background image) of an entire image to be printed on a recording medium P such as a plastic sheet. The secondary transfer unit 22 then transfers the background color on the recording medium P such as a plastic sheet.

For example, when a white background layer is desired to be printed on a recording medium P such as a transparent plastic sheet, the imaging unit 20U for white is positioned at and held by the holder 20A5 as illustrated in FIG. 3. In order to realize such positioning, for example, the imaging units 20U for white (W) and black (K) illustrated in FIG. 2 are interchanged.

<Example of Light Beam Scanner>

Now, a description is given of a configuration of one of the five light beam scanners 21 for white, yellow, magenta, cyan, and black provided that the five light beam scanners 21 have substantially the same configurations. Therefore, redundant descriptions are herein omitted.

Figure 4:
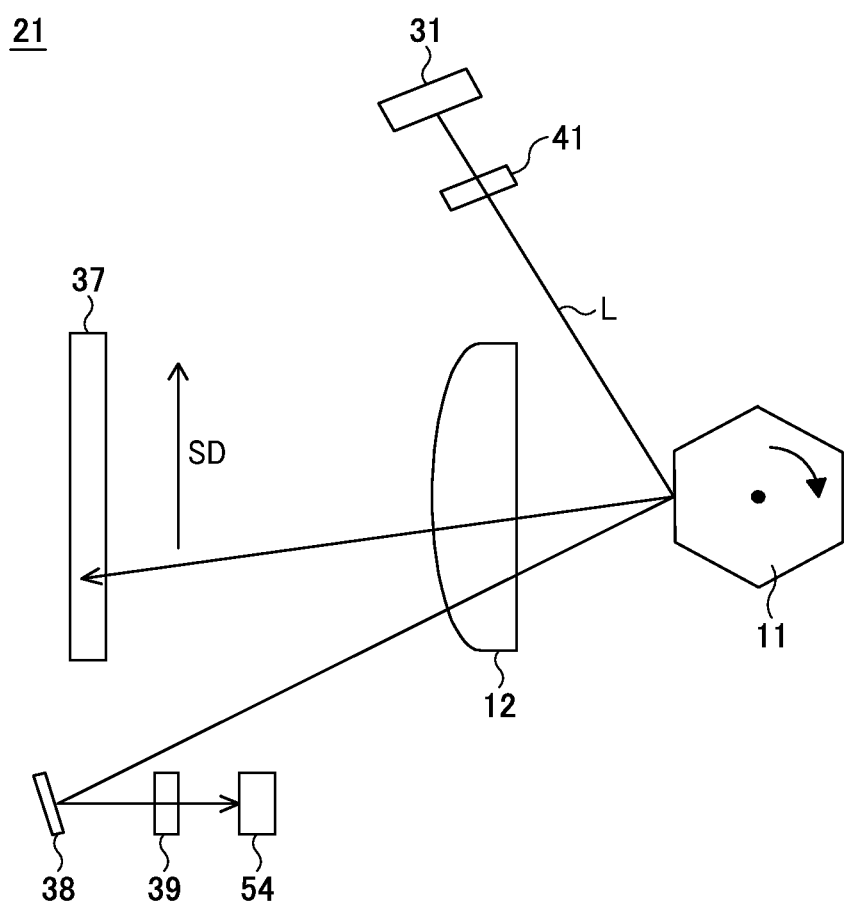
FIG. 4 is a schematic view of a light beam scanner incorporated in the imaging device of FIGS. 2 and 3.

Referring now to FIG. 4, a description is given of a configuration of the light beam scanner 21 incorporated in the imaging device 20 described above.

FIG. 4 is a schematic view of the light beam scanner 21. Note that, in FIG. 4, SD represents a scanning direction.

As illustrated in FIG. 4, the light beam scanner 21 includes a polygon mirror 11, an f-θ lens 12, a laser diode (LD) control board 31, a deflection mirror 37, a synchronization mirror 38, a synchronization lens 39, a cylinder lens 41, and a synchronization sensor 54.

In the example of the light beam scanner 21 illustrated in FIG. 4, the LD control board 31 includes a light source, which is, e.g., an LD. First, the LD control board 31 causes the light source to emit a light beam L according to image data. In other words, without receiving the image data, the light beam scanner 21 does not irradiate the photoconductor 40.

The light beam L emitted from the LD control board 31 passes through the cylinder lens 41 and strikes the polygon mirror 11. The polygon mirror 11 rotated by, e.g., a motor reflects the incident light beam L. Rotation of the polygon mirror 11 also deflects the light beam L. The light beam L reflected by the polygon mirror 11 passes through the f-O lens 12 and strikes the deflection mirror 37 to scan the surface of the photoconductor 40.

As illustrated in FIG. 4, for example, the synchronization mirror 38, the synchronization lens 39, and the synchronization sensor 54 are disposed at an end from which writing starts in the main scanning direction. The light beam L passes through the f-O lens 12 and strikes the synchronization mirror 38. The synchronization mirror 38 reflects the light beam L to the synchronization lens 39. The synchronization lens 39 condenses the light beam L reflected by the synchronization mirror 38. The light beam L thus condensed strikes the synchronization sensor 54. Thus, from the incident light beam L, the synchronization sensor 54 detects a writing start timing in the main scanning direction.

Figure 5:
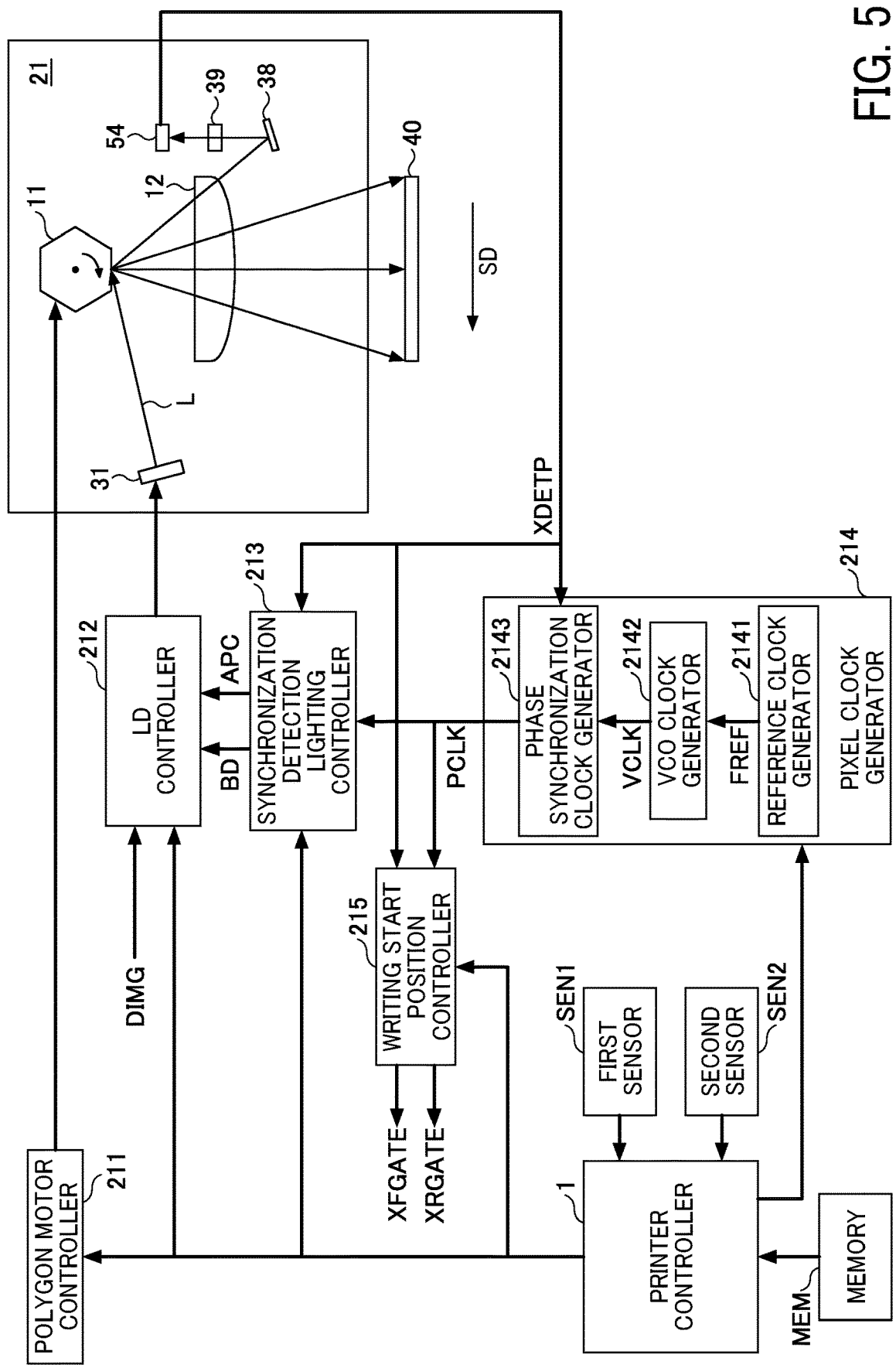
FIG. 5 is a block diagram illustrating a hardware configuration of the light beam scanner device of FIG. 4 and peripherals thereof.

Referring now to FIG. 5, a description is given of a hardware configuration of the light beam scanner 21 described above and peripherals thereof.

FIG. 5 is a block diagram illustrating the hardware configuration of the light beam scanner 21 and the peripherals thereof.

FIG. 5 illustrates a configuration of the light beam scanners 21 for one color.

The light beam scanner 21 is connected with a polygon motor controller 211, an LD controller 212, a synchronization detection lighting controller 213, a pixel clock generator 214, and a writing start position controller 215. A printer controller 1 is connected to, e.g., the polygon motor controller 211. The printer controller 1 is also connected with the first sensor SEN1, the second sensor SEN2, and a memory MEM.

As described above, the light beam L emitted from the LD control board 31 is detected by, e.g., the synchronization sensor 54. Upon detection of the light beam L, the synchronization sensor 54 outputs a synchronization detection signal XDETP to the synchronization detection lighting controller 213, the pixel clock generator 214, and the writing start position controller 215.

The synchronization detection lighting controller 213 turns on an LD forcibly lighting signal BD to generate a synchronization detection signal XDETP. When the LD forcibly lighting signal BD is turned on, the LD controller 212 causes the LD control board 31 to emit a light beam L. On the other hand, after the synchronization detection signal XDETP is output, the synchronization detection lighting controller 213 causes the LD control board 31 to emit a light beam L according to the synchronization detection signal XDETP and a pixel clock signal PCLK. Specifically, the LD controller 212 times emission of the light beam L from the LD control board 31 such that flare light is not generated and that the synchronization detection signal XDETP is generated. Upon detection of the synchronization detection signal XDETP, the synchronization detection lighting controller 213 generates and transmits, to the LD controller 212, an LD forcibly lighting signal BD that turns off the LD.

The synchronization detection lighting controller 213 also generates an LD light amount control timing signal APC (hereinafter referred to as a light amount control timing signal APC) according to the synchronization detection signal XDETP and the pixel clock signal PCLK. Then, the synchronization detection lighting controller 213 transmits the light amount control timing signal APC to the LD controller 212. The LD controller 212 performs processing according to the light amount control timing signal APC outside an image writing area. That is, the LD controller 212 performs a light amount adjustment control, for example, in response to the light amount control timing signal APC.

The LD controller 212 causes the LD control board 31 to emit the light beam L according to a signal indicating image data DIMG synchronized with the LD forcibly lighting signal BD, the light amount control timing signal APC, and the pixel clock signal PCLK. The light beam L emitted from the LD control board 31 strikes the polygon mirror 11. The light beam L deflected by the polygon mirror 11 passes through the f-O lens 12 to scan the photoconductor 40.

The polygon motor controller 211 controls rotation of a polygon motor at a given number or speed, according to a control signal from the printer controller 1.

The writing start position controller 215 generates signals for determining a writing start timing and an image width, according to the control signal from the printer controller 1, the synchronization detection signal XDETP, and the pixel clock signal PCLK, for example. The signals for determining the writing start timing and the image width are a main scanning control signal XRGATE and a sub-scanning control signal XFGATE.

Each of the first sensor SEN1 and the second sensor SEN2 detects a correction pattern, serving as a visible pattern image, and transmits the detection result to the printer controller 1. Based on the detection results received, the printer controller 1 calculates misalignment. Based on the misalignment calculated, the printer controller 1 generates correction data. Based on the correction data generated, the printer controller 1 sets the pixel clock generator 214 and the writing start position controller 215. On the other hand, the printer controller 1 stores the correction data in the memory MEM. In short, upon image formation, the printer controller 1 retrieves the correction data from the memory MEM to set the pixel clock generator 214 and the writing start position controller 215.

The pixel clock generator 214 includes a reference clock generator 2141, a voltage-controlled oscillator (VCO) clock generator 2142, and a phase synchronization clock generator 2143.

The reference clock generator 2141 generates a reference clock signal FREF.

The VCO clock generator 2142 generates a VCO clock signal VCLK.

Figure 6:
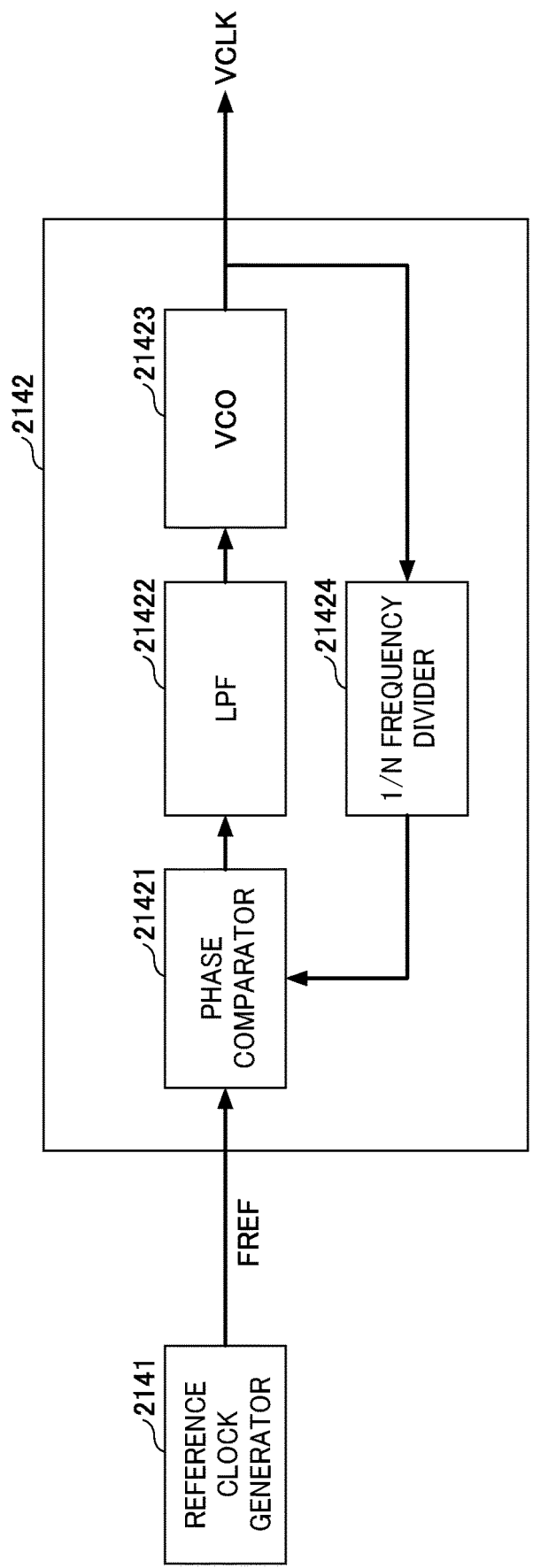
FIG. 6 is a block diagram illustrating a configuration of a voltage-controlled oscillator clock generator according to an embodiment of the present disclosure.

Referring now to FIG. 6, a description is given of a configuration of the VCO clock generator 2142 according to an embodiment of the present disclosure.

FIG. 6 is a block diagram illustrating the configuration of the VCO clock generator 2142.

As illustrated in FIG. 6, the VCO clock generator 2142 includes a phase comparator 21421, a low-pass filter (LPF) 21422, a VCO 21423, and an 1/N frequency divider 21424.

The phase comparator 21421 receives a reference clock signal FREF and a clock signal having an 1/N frequency from the reference clock generator 2141 and the 1/N frequency divider 21424, respectively. The phase comparator 21421 compares phases of falling edges of the two input signals (i.e., the reference clock signal FREF and the clock signal). The phase comparator 21421 then outputs an error component to the LPF 21422 at a given current.

The LPF 21422 removes a high frequency component from the error component output from the phase comparator 21421. The LPF 21422 then outputs a direct current (DC) voltage to the VCO 21423.

Based on the DC voltage output from the LPF 21422, the VCO 21423 outputs a VCO clock signal VCLK having a given frequency.

The 1/N frequency divider 21424 receives the VCO clock signal VCLK and divides the frequency of the VCO clock signal VCLK by a given frequency division ratio N to obtain the clock signal having an 1/N frequency.

Note that the frequency of the reference clock signal FREF and the frequency division ratio N are settable with the printer controller 1. Therefore, in order to change the frequency of the VCO clock signal VCLK, the printer controller 1 sets the pixel clock generator 214 so as to change the frequency of the reference clock signal FREF and the frequency division ratio N.

Referring back to FIG. 5, the phase synchronization clock generator 2143 receives the VCO clock signal VCLK from the VCO clock generator 2142 and a synchronization detection signal XDETP. The phase synchronization clock generator 2143 outputs a pixel clock signal PCLK synchronized with the synchronization detection signal XDETP to, e.g., the synchronization detection lighting controller 213.

Figure 7:
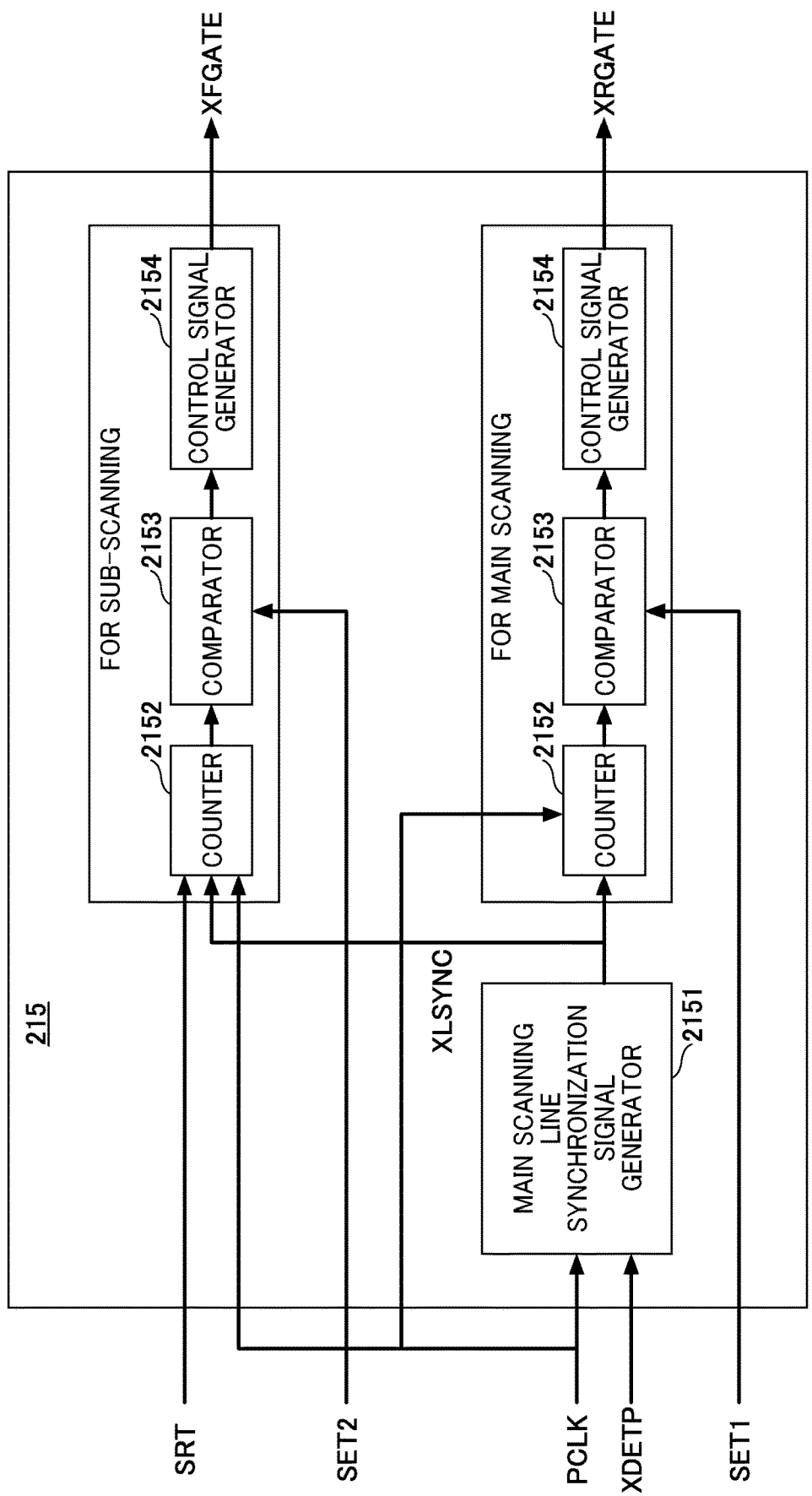
FIG. 7 is a block diagram illustrating a configuration of a writing start position controller according to an embodiment of the present disclosure.

Referring now to FIG. 7, a description is given of a configuration of the writing start position controller 215 according to an embodiment of the present disclosure.

FIG. 7 is a block diagram illustrating the configuration of the writing start position controller 215.

As illustrated in FIG. 7, the writing start position controller 215 includes a main scanning line synchronization signal generator 2151, which receives a pixel clock signal PCLK and a synchronization detection signal XDETP. The writing start position controller 215 further includes a counter 2152, a comparator 2153, and a control signal generator 2154 for each of main scanning and sub-scanning.

As described above, the writing start position controller 215 generates a main scanning control signal XRGATE and a sub scanning control signal XFGATE. Note that the main scanning control signal XRGATE is generated so as to indicate when to capture a signal indicating image data in the main scanning direction, that is, when to start writing an image (i.e., image writing start timing) in the main scanning direction. On the other hand, the sub-scanning control signal XFGATE is generated so as to indicate when to capture a signal indicating image data in the sub-scanning direction, that is, when to start writing an image (i.e., image writing start timing) in the sub-scanning direction. The main scanning direction is the scanning direction of the light beam L (i.e., scanning direction SD illustrated in FIGS. 4 and 5). The sub-scanning direction is a direction perpendicular to the main scanning direction. In other words, the sub-scanning direction is a direction of rotation of the photoconductor 40.

The counter 2152 for each of the main scanning and the sub-scanning operates in response to a counter operation signal XLSYNC from the main scanning line synchronization signal generator 2151. Note that the counter 2152 for the main scanning is hereinafter referred to as a main scanning counter 2152; whereas the counter 2152 for the sub-scanning is hereinafter referred to as a sub-scanning counter 2152.

The comparator 2153 for the main scanning (hereinafter referred to as a main scanning comparator 2153) compares, with a first set value SET1, a value indicated by the main scanning counter 2152 that operates according to the counter operation signal XLSYNC and the pixel clock signal PCLK. Note that the main scanning comparator 2153 receives the first set value SET1 from the printer controller 1 illustrated in FIG. 5. The first set value SET1 is a value determined based on the correction data.

The control signal generator 2154 for the main scanning (hereinafter referred to as a main scanning control signal generator 2154) generates a main scanning control signal XRGATE based on a comparison result output from the main scanning comparator 2153.

The sub-scanning counter 2152 receives a printing start signal SRT from the printer controller 1. The sub-scanning counter 2152 operates according to the printing start signal SRT, the counter operation signal XLSYNC, and the pixel clock signal PCLK.

The comparator 2153 for the sub-scanning (hereinafter referred to as a sub-scanning comparator 2153) compares a value indicated by the sub-scanning counter 2152 with a second set value SET2. Note that the sub-scanning comparator 2153 receives the second set value SET2 from the printer controller 1. The second set value SET2 is a value determined based on the correction data.

The control signal generator 2154 for the sub-scanning (hereinafter referred to as a sub-scanning control signal generator 2154) generates a sub-scanning control signal XFGATE based on a comparison result output from the sub-scanning comparator 2153.

The writing start position controller 215 corrects a writing start position in the main scanning direction in a unit of the pixel clock signal PCLK, that is, on a per dot basis. On the other hand, the writing start position controller 215 corrects a writing start position in the sub-scanning direction in a unit of the counter operation signal XLSYNC, that is, on a per line basis.

Figure 8:
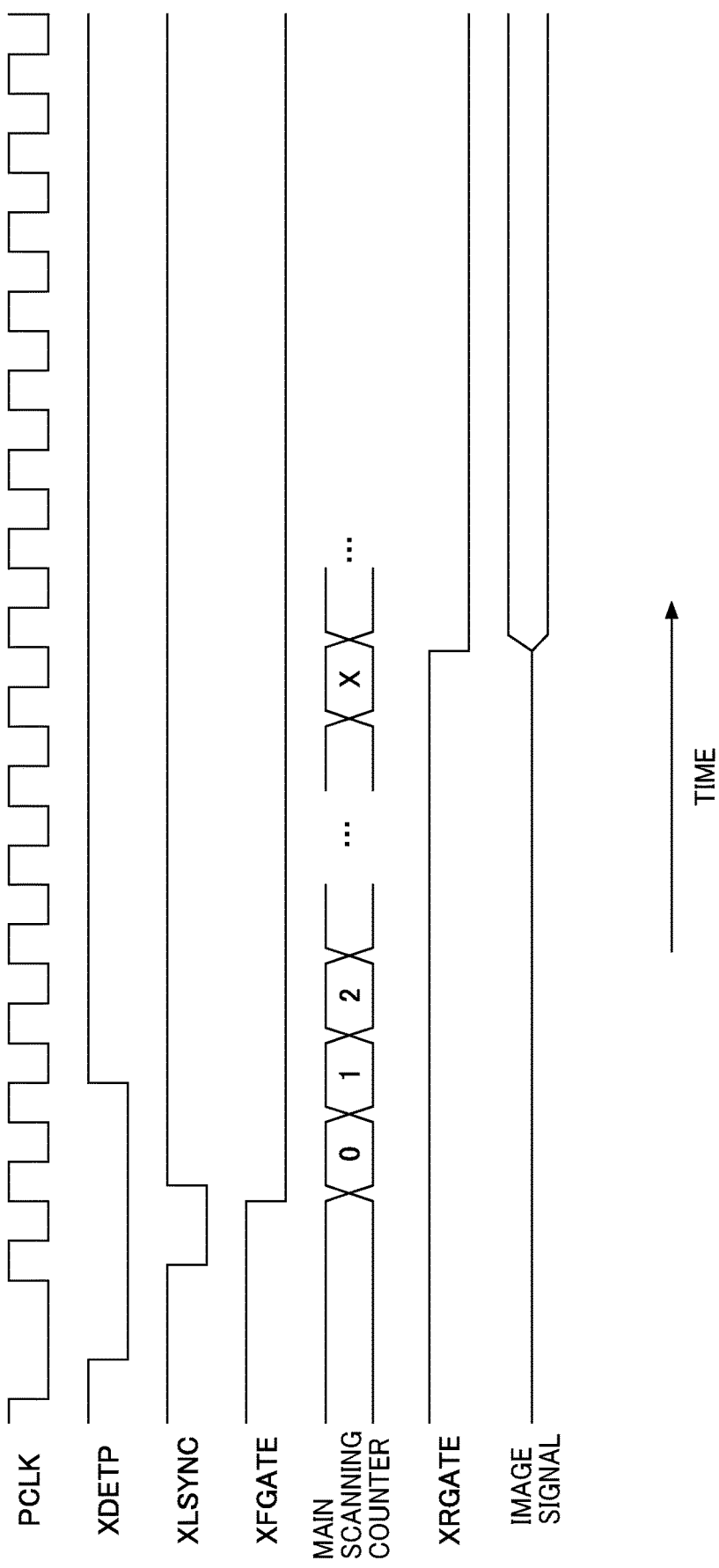
FIG. 8 is a timing chart illustrating an example of controlling a writing start position in a main scanning direction according to an embodiment of the present disclosure.

Referring now to FIG. 8, a description is given of an example of controlling the writing start position in the main scanning direction according to an embodiment of the present disclosure.

FIG. 8 is a timing chart illustrating an example of controlling the writing start position in the main scanning direction according to an embodiment of the present disclosure.

Note that the following describes the synchronization detection signal XDETP, the counter operation signal XLSYNC, the main scanning control signal XRGATE, and the sub-scanning control signal XFGATE as low active signals effective at a low level.

The counter operation signal XLSYNC resets a main scanning counter. Note that the main scanning counter is a counter value indicated by the main scanning counter 2152 illustrated in FIG. 7.

The pixel clock signal PCLK counts up the main scanning counter.

When the main scanning counter reaches the first set value SET1 illustrated in FIG. 7, the main scanning comparator 2153 illustrated in FIG. 7 outputs a signal as a comparison result. In the present example of FIG. 8, "X" represents the first set value SET1. In response to the comparison result (i.e., the signal indicating that the main scanning counter reaches the first set value SET1) from the main scanning comparator 2153, the main scanning control signal generator 2154 illustrated in FIG. 7 sets the main scanning control signal XRGATE to a low level. Note that the main scanning control signal XRGATE is a signal that becomes a low level by an image width in the main scanning direction.

Figure 9:
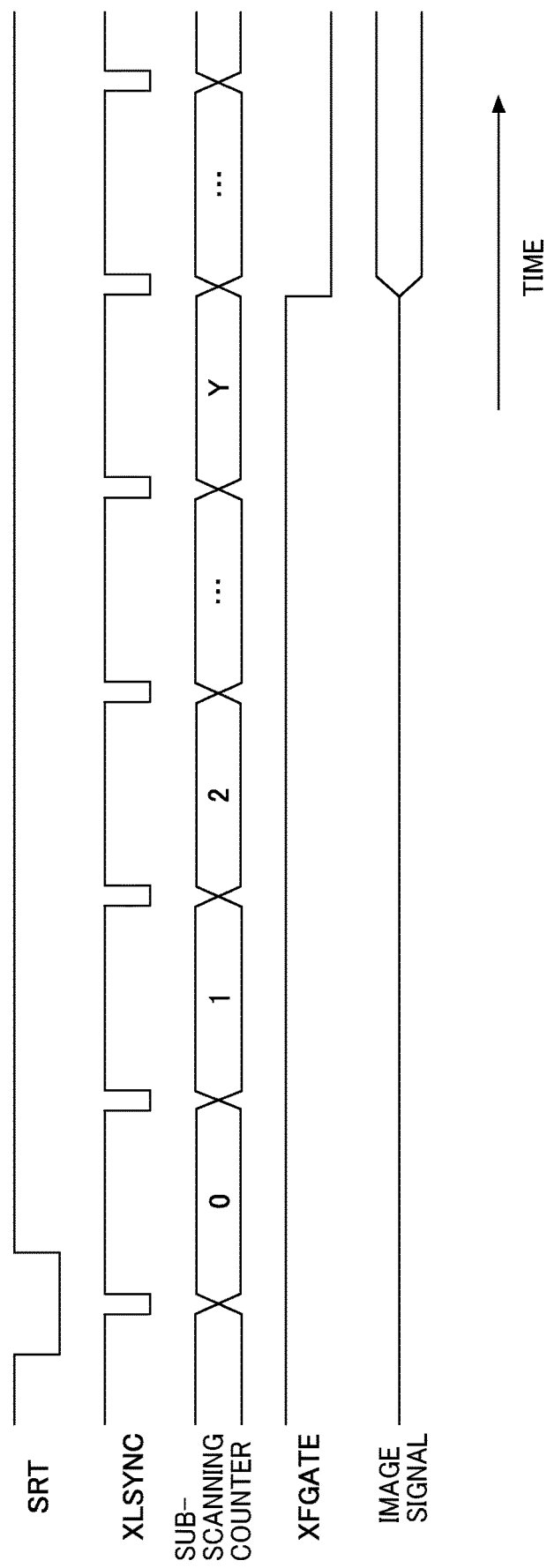
FIG. 9 is a timing chart illustrating an example of controlling a writing start position in a sub-scanning direction according to an embodiment of the present disclosure.

Referring now to FIG. 9, a description is given of an example of controlling the writing start position in the sub-scanning direction according to an embodiment of the present disclosure.

FIG. 9 is a timing chart illustrating an example of controlling the writing start position in the sub-scanning direction according to an embodiment of the present disclosure.

The printing start signal SRT resets a sub-scanning counter. Note that the sub-scanning counter is a counter value indicated by the sub-scanning counter 2152 illustrated in FIG. 7.

The counter operation signal XLSYNC counts up the sub-scanning counter.

When the sub-scanning counter reaches the second set value SET2 illustrated in FIG. 7, the sub-scanning comparator 2153 illustrated in FIG. 7 outputs a signal as a comparison result. In the present example of FIG. 9, "Y" represents the second set value SET2. In response to the comparison result (i.e., the signal indicating that the sub-scanning counter reaches the second set value SET2) from the sub-scanning comparator 2153, the sub-scanning control signal generator 2154 illustrated in FIG. 7 sets the sub-sub-scanning control signal XFGATE to a low level. Note that the sub-scanning control signal XFGATE is a signal that becomes a low level by an image length in the sub-scanning direction.

Figure 10:
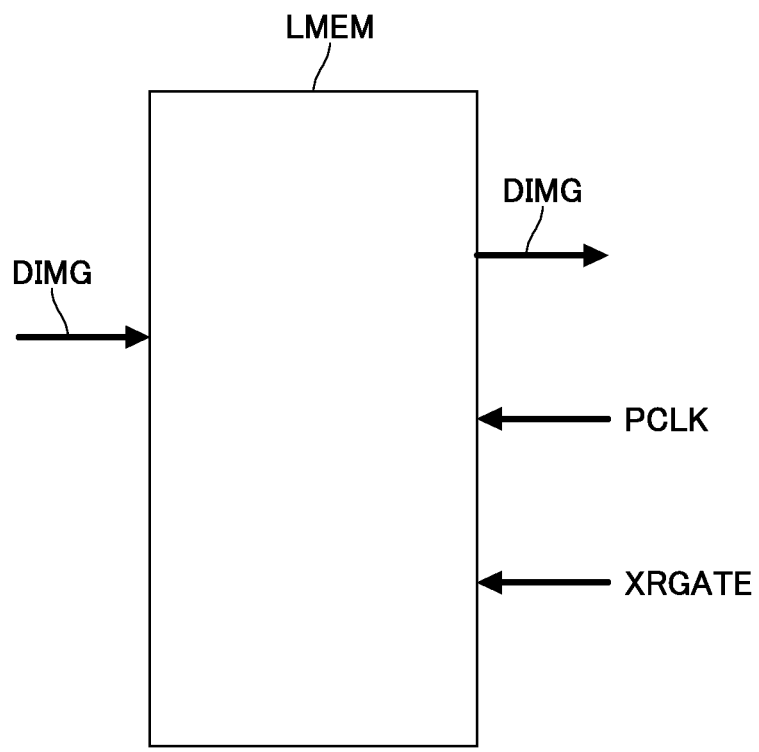
FIG. 10 is a schematic diagram of a line memory incorporated in the image forming apparatus of FIG. 1.

Referring now to FIG. 10, a description is given of a line memory LMEM incorporated in the image forming apparatus 1000 described above.

FIG. 10 is a schematic diagram of the line memory LMEM.

The line memory LMEM illustrated in FIG. 10 is used, e.g., in a stage preceding the configuration illustrated in FIG. 5.

The line memory LMEM stores image data DIMG imported from a printer controller, a frame memory, a scanner, or the like according to a timing indicated by, e.g., the sub-scanning control signal XFGATE. The image data DIMG is retrieved as a several-beam signal in synchronization with the pixel clock signal PCLK. The signal is transmitted to the LD controller 212 from the line memory LMEM. The LD controller 212 turns on the LD according to the timing indicated by the signal.

<Example of Misalignment Correction>

Figure 11:
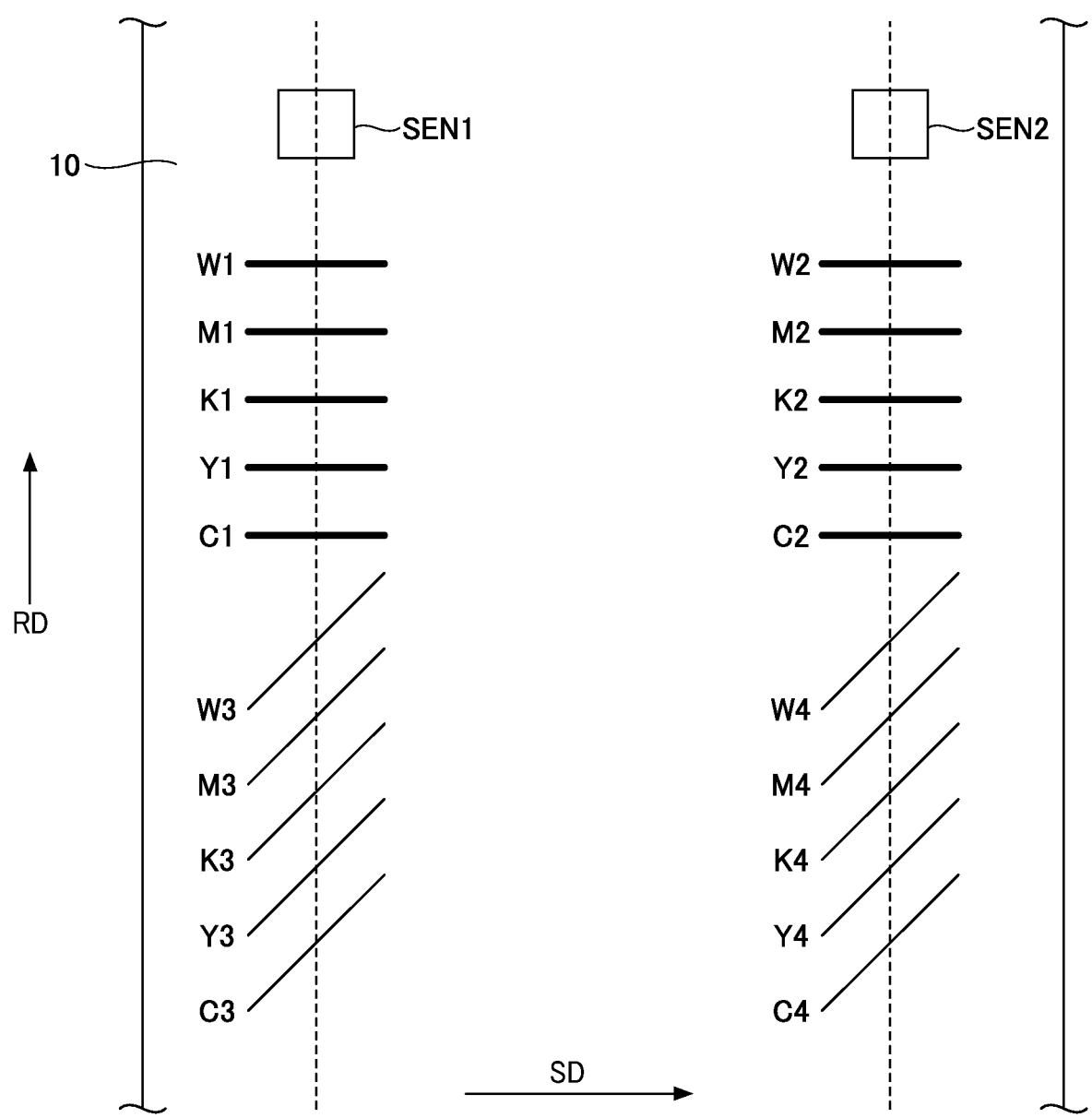
FIG. 11 is a diagram illustrating a first example of misalignment correction with full-color correction patterns performed by the image forming apparatus of FIG. 1.

Referring now to FIG. 11, a description is given of a first example of misalignment correction with full-color correction patterns performed by the image forming apparatus 1000 described above.

FIG. 11 is a diagram illustrating the first example of misalignment correction with full-color correction patterns performed by the image forming apparatus 1000.

FIG. 11 illustrates the correction patterns transferred onto the intermediate transfer belt 10 when the holder 20A1 holds the imaging unit 20U for white (W) while the holder 20A5 holds the imaging unit 20U for black (K) as illustrated in FIG. 2.

In the present example of FIG. 11, the white, magenta, black, yellow, and cyan correction patterns are formed on the intermediate transfer belt 10. Specifically, the correction patterns are formed in the shapes of horizontal lines and oblique lines on the intermediate transfer belt 10 according to a preset timing. Note that the correction patterns formed in the shapes of horizontal lines and oblique lines are hereinafter referred to as horizontal correction patterns and oblique correction patterns, respectively.

When the intermediate transfer belt 10 rotates in the rotation direction RD, the first sensor SEN1 and the second sensor SEN2 detect the correction patterns. The first sensor SEN1 and the second sensor SEN2 transmit detection results to the printer controller 1 illustrated in FIG. 5. Based on the detection results, the printer controller 1 calculates misalignments of the correction patterns of four colors in relation to the correction pattern of a reference color (hereinafter referred to as a reference correction pattern).

A misaligned oblique correction pattern is detected at a different time from a given time. That is, the oblique correction pattern enables correction of an image position and magnification in the main scanning direction.

On the other hand, a misaligned horizontal correction pattern is detected at a different time from a given time. That is, the horizontal correction pattern enables correction of an image position in the sub-scanning direction.

As described above, the correction patterns exemplified in FIG. 11 include white, magenta, black, yellow, and cyan correction patterns. Specifically, the white correction patterns include a first white pattern W1, a second white pattern W2, a third white pattern W3, and a fourth white pattern W4. The magenta correction patterns include a first magenta pattern M1, a second magenta pattern M2, a third magenta pattern M3, and a fourth magenta pattern M4.

The black correction patterns include a first black pattern K1, a second black pattern K2, a third black pattern K3, and a fourth black pattern K4. The yellow correction patterns include a first yellow pattern Y1, a second yellow pattern Y2, a third yellow pattern Y3, and a fourth yellow pattern Y4. Cyan correction patterns include a first cyan pattern C1, a second cyan pattern C2, a third cyan pattern C3, and a fourth cyan pattern C4.

Among the correction patterns described above with reference to FIG. 11, the horizontal correction patterns include the first and second correction patterns, namely, the first white pattern W1, the second white pattern W2, the first magenta pattern M1, the second magenta pattern M2, the first black pattern K1, the second black pattern K2, the first yellow pattern Y1, the second yellow pattern Y2, the first cyan pattern C1, and the second cyan pattern C2.

The oblique correction patterns include the third and fourth correction patterns, namely, the third white pattern W3, the fourth white pattern W4, the third magenta pattern M3, the fourth magenta pattern M4, the third black pattern K3, the fourth black pattern K4, the third yellow pattern Y3, the fourth yellow pattern Y4, the third cyan pattern C3, and the fourth cyan pattern C4. Note that the correction patterns having substantially the same colors and shapes are hereinafter described with the same reference numerals.

The first and second correction patterns (i.e., horizontal correction patterns) and the third and fourth correction patterns (i.e., oblique correction patterns) are formed in the order of cyan (C), yellow (Y), black (K), magenta (M), and white (W) from the upstream side to the downstream side in the rotation direction RD of the intermediate transfer belt 10. The imaging unit 20U for black (K) positioned at the holder 20A5 as a reference forms the first to fourth black patterns K1 to K4. Each of the first to fourth black patterns K1 to K4 (i.e., reference correction patterns) is transferred onto the intermediate transfer belt 10 to be a center of the five color correction patterns in the rotation direction RD of the intermediate transfer belt 10, thereby reducing differences between the misalignments of cyan, yellow, magenta, and white correction patterns in relation to the black correction pattern as a reference pattern. Note that the misalignments of cyan, yellow, magenta, and white correction patterns in relation to the black correction pattern may be hereinafter simply referred to as misalignments of cyan, yellow, magenta, and white in relation to black.

In the present embodiment, one of the holders 20A1 to 20A5 is designated as a reference for misalignment calculation and correction, instead of an imaging unit 20U for a specific color. As an example, the holder 20A5 is herein designated as the reference.

In a case in which the holder 20A5 holds the imaging unit 20U for black as illustrated in FIG. 2, the printer controller 1 calculates misalignments of the correction patterns of four colors (i.e., white, magenta, yellow, and cyan) in relation to the correction patterns of black (i.e., first to fourth black patterns K1 to K4) as reference correction patterns on the intermediate transfer belt 10.

By contrast, in a case in which the holder 20A5 holds the imaging unit 20U for white as illustrated in FIG. 3, the printer controller 1 calculates misalignments of the correction patterns of four colors (i.e., black, magenta, yellow, and cyan) in relation to the correction patterns of white (i.e., first to fourth white patterns W1 to W4) as reference correction patterns on the intermediate transfer belt 10.

Thus, the printer controller 1 calculates misalignments of the correction patterns of four colors in relation to the reference correction pattern formed by the imaging unit 20U held by the holder 20A5 and transferred on the intermediate transfer belt 10.

When the imaging units 20U for, e.g., black and another color are interchanged, a black correction pattern is formed at a different position on the intermediate transfer belt 10. If a correction pattern of a specific color (e.g., black correction pattern) is designated as a reference correction pattern for misalignment calculation, such a positional change of the reference correction pattern may also change the way of calculating the misalignment. That is, the position of the reference correction pattern changes among the correction patterns of the five colors illustrated in FIG. 11.

To address such a situation, according to the present embodiment, one of the holders 20A1 to 20A5 (e.g., holder 20A5) is designated as the reference for misalignment calculation. Designation of, e.g., the holder 20A5 as the reference for misalignment calculation allows the printer controller 1 to calculate the misalignments of the correction patterns of four colors in relation to the reference correction pattern formed by the imaging unit 20U positioned at the holder 20A5 and transferred onto the intermediate transfer belt 10, irrespective of the color of the correction pattern formed by the imaging unit 20U positioned at the holder 20A5. This is because of unchanged relative positions of the imaging unit 20U disposed in the holder 20A5 and the light beam scanner 21 for the holder 20A5.

In short, according to the present embodiment, the printer controller 1 calculates the misalignment of a correction pattern in relation to a reference correction pattern formed by the imaging unit 20U held by the holder 20A5 and transferred onto the intermediate transfer belt 10.

The holder 20A5 is herein described as a representative example of the reference. Alternatively, any one of the holders 20A1 to 20A4 may be designated as the reference. Now, a detailed description is given of the misalignment correction.

Initially, a description is given of an example of correction of misalignment in the main scanning direction. In the present example, the misalignment in the main scanning direction is detected with the first black pattern K1 and the third black pattern K3 as references. Specifically, the printer controller 1 compares a time interval between detection of the first cyan pattern C1 and detection of the third cyan pattern C3 with a reference time interval between detection of the first black pattern K1 and detection of the third black pattern K3. The comparison result (i.e., difference in time intervals) is herein referred to as "TKC 13".

Similarly, the printer controller 1 compares a time interval between detection of the second cyan pattern C2 and detection of the fourth cyan pattern C4 with a reference time interval between detection of the second black pattern K2 and detection of the fourth black pattern K4. The comparison result (i.e., difference in time intervals) is herein referred to as "TKC24".

A magnification error between cyan and black is obtained by subtracting the "TKC13" from the "TKC24" (i.e., "TKC24−TKC13"). The pixel clock frequency is changed based on the magnification error thus obtained. Accordingly, the misalignment caused by the magnification error is corrected.

Further, the misalignment of cyan in relation to black in the main scanning direction is calculated by subtracting a correction amount for correcting the magnification error at the position of the first sensor SEN1 from the "TKC13". Based on the misalignment in the main scanning direction thus calculated, the timing of outputting the main scanning control signal XRGATE illustrated in FIG. 8 is changed. Accordingly, the misalignment of cyan in relation to black in the main scanning direction is corrected. Similarly, the misalignments of magenta, yellow, and white in relation to black in the main scanning direction are corrected.

Now, a description is given of an example of correction of misalignment in the sub-scanning direction. First, an ideal time is defined as "Tc". The first sensor SEN1 detects the first black pattern K1 and then the first cyan pattern C1. A time interval between detection of the first black pattern K1 and detection of the first cyan pattern C1 is herein defined as "TKC1". Similarly, the second sensor SEN2 detects the second black pattern K2 and then the second cyan pattern C2. A time interval between detection of the second black pattern K2 and detection of the second cyan pattern C2 is herein defined as "TKC2".

The misalignment of cyan in relation to black in the sub-scanning direction is calculated by "{(TKC2+TKC1)/2}−Tc". Based on the misalignment in the sub-scanning direction thus calculated, the timing of outputting the sub-scanning control signal XFGATE illustrated in FIG. 8 is changed. Accordingly, the misalignment of cyan in relation to black in the sub-scanning direction is corrected. Similarly, the misalignments of magenta, yellow, and white in relation to black in the sub-scanning direction are corrected.

Figure 12:
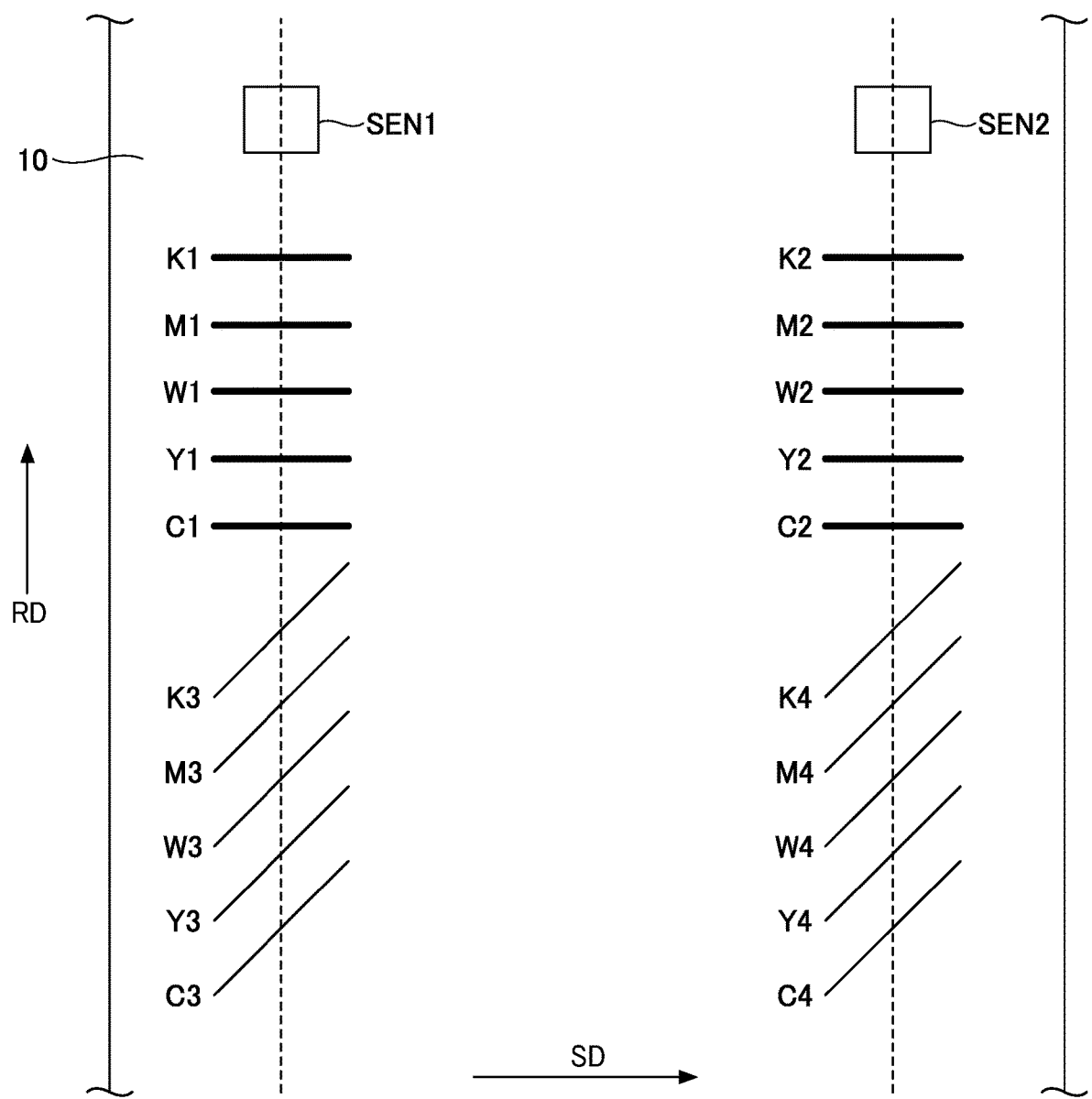
FIG. 12 is a diagram illustrating a second example of misalignment correction with full-color correction patterns performed by the image forming apparatus of FIG. 1.

Referring now to FIG. 12, a description is given of a second example of misalignment correction with full-color correction patterns performed by the image forming apparatus 1000 described above.

FIG. 12 is a diagram illustrating the second example of misalignment correction with full-color correction patterns performed by the image forming apparatus 1000.

FIG. 12 illustrates the correction patterns transferred onto the intermediate transfer belt 10 when the holder 20A1 holds the imaging unit 20U for black (K) while the holder 20A5 holds the imaging unit 20U for white (W) as illustrated in FIG. 3.

The first and second correction patterns (i.e., horizontal correction patterns) and the third and fourth correction patterns (i.e., oblique correction patterns) are formed in the order of cyan (C), yellow (Y), white (W), magenta (M), and black (K) from the upstream side to the downstream side in the rotation direction RD of the intermediate transfer belt 10. The imaging unit 20U for white (W) positioned at the holder 20A5 as a reference forms the first to fourth white patterns W1 to W4. Each of the first to fourth black patterns W1 to W4 (i.e., reference correction patterns) is transferred onto the intermediate transfer belt 10 to be a center of the five color correction patterns in the rotation direction RD of the intermediate transfer belt 10, thereby reducing differences between the misalignments of cyan, yellow, magenta, and black correction patterns in relation to the white correction pattern as a reference pattern. Note that the misalignments of cyan, yellow, magenta, and black correction patterns in relation to the white correction pattern may be hereinafter simply referred to as misalignments of cyan, yellow, magenta, and black in relation to white.

A description is now given of an example of correction of misalignment in the main scanning direction. In the present example, the misalignment in the main scanning direction is detected with the first white pattern W1 and the third white pattern W3 as references. Specifically, the printer controller 1 compares a time interval between detection of the first cyan pattern C1 and detection of the third cyan pattern C3 with a reference time interval between detection of the first white pattern W1 and detection of the third white pattern W3. The comparison result (i.e., difference in time intervals) is herein referred to as "TWC13".

Similarly, the printer controller 1 compares a time interval between detection of the second cyan pattern C2 and detection of the fourth cyan pattern C4 with a reference time interval between detection of the second white pattern W2 and detection of the fourth white pattern W4. The comparison result (i.e., difference in time intervals) is herein referred to as "TWC24".

A magnification error between cyan and white is obtained by subtracting the "TWC13" from the "TWC24" (i.e., "TWC24−TWC13"). The pixel clock frequency is changed based on the magnification error thus obtained. Accordingly, the misalignment caused by the magnification error is corrected.

Further, the misalignment of cyan in relation to white in the main scanning direction is calculated by subtracting a correction amount for correcting the magnification error at the position of the first sensor SEN1 from the "TWC13". Based on the misalignment in the main scanning direction thus calculated, the timing of outputting the main scanning control signal XRGATE illustrated in FIG. 8 is changed. Accordingly, the misalignment of cyan in relation to white in the main scanning direction is corrected. Similarly, the misalignments of magenta, yellow, and black in relation to white in the main scanning direction are corrected.

Now, a description is given of an example of correction of misalignment in the sub-scanning direction. First, an ideal time is defined as "Tc". The first sensor SEN1 detects the first white pattern W1 and then the first cyan pattern C1. A time interval between detection of the first white pattern W1 and detection of the first cyan pattern C1 is herein defined as "TWC1". Similarly, the second sensor SEN2 detects the second white pattern W2 and then the second cyan pattern C2. A time interval between detection of the second white pattern W2 and detection of the second cyan pattern C2 is herein defined as "TWC2".

The misalignment of cyan in relation to white in the sub-scanning direction is calculated by "{(TWC2+TWC1)/2}−Tc". Based on the misalignment in the sub-scanning direction thus calculated, the timing of outputting the sub-scanning control signal XFGATE illustrated in FIG. 8 is changed. Accordingly, the misalignment of cyan in relation to white in the sub-scanning direction is corrected. Similarly, the misalignments of magenta, yellow, and black in relation to white in the sub-scanning direction are corrected.

Figure 13:
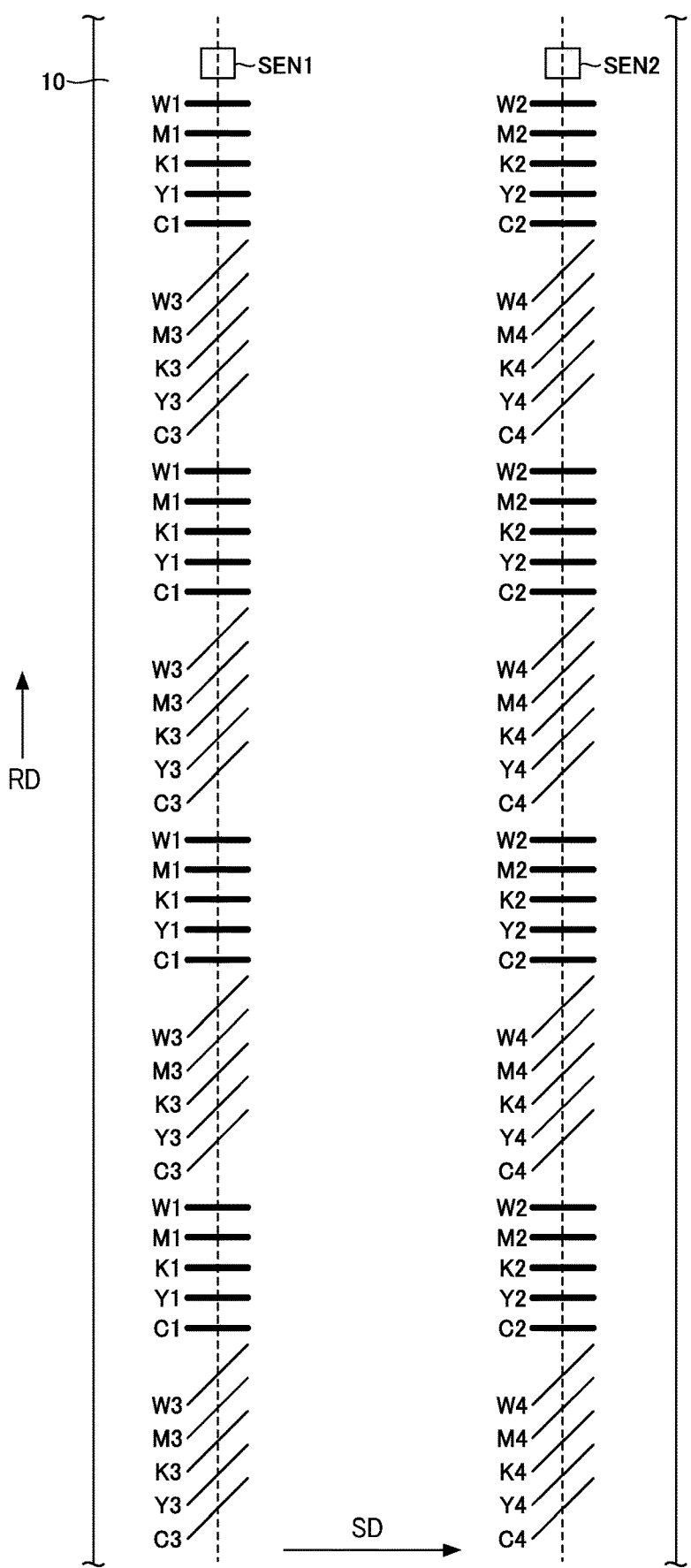
FIG. 13 is a diagram illustrating a third example of misalignment correction with full-color correction patterns performed by the image forming apparatus of FIG. 1.

Referring now to FIG. 13, a description is given of a third example of misalignment correction with full-color correction patterns performed by the image forming apparatus 1000 described above.

FIG. 13 is a diagram illustrating the third example of misalignment correction with full-color correction patterns performed by the image forming apparatus 1000.

FIG. 13 illustrates four sets of the correction patterns illustrated in FIG. 11 formed on the intermediate transfer belt 10 in the rotation direction RD thereof. Alternatively, four sets of the correction patterns illustrated in FIG. 12 may be formed on the intermediate transfer belt 10 in the rotation direction RD thereof. For each of the four sets of correction patterns formed in the rotation direction RD of the intermediate transfer belt 10, the magnification error, the misalignment in the main scanning direction, and the misalignment in the sub-scanning direction are calculated to obtain an average magnification error, an average misalignment in the main scanning direction, and an average misalignment in the sub-scanning direction of the four sets of correction patterns.

The misalignment is corrected with the average magnification error, the average misalignment in the main scanning direction, and the average misalignment in the sub-scanning direction thus obtained. Accordingly, the image misalignment is effectively reduced.

Note that the shape, number, and position of the correction patterns formed are not limited to those described above with reference to FIGS. 11 to 13.

Figure 14:
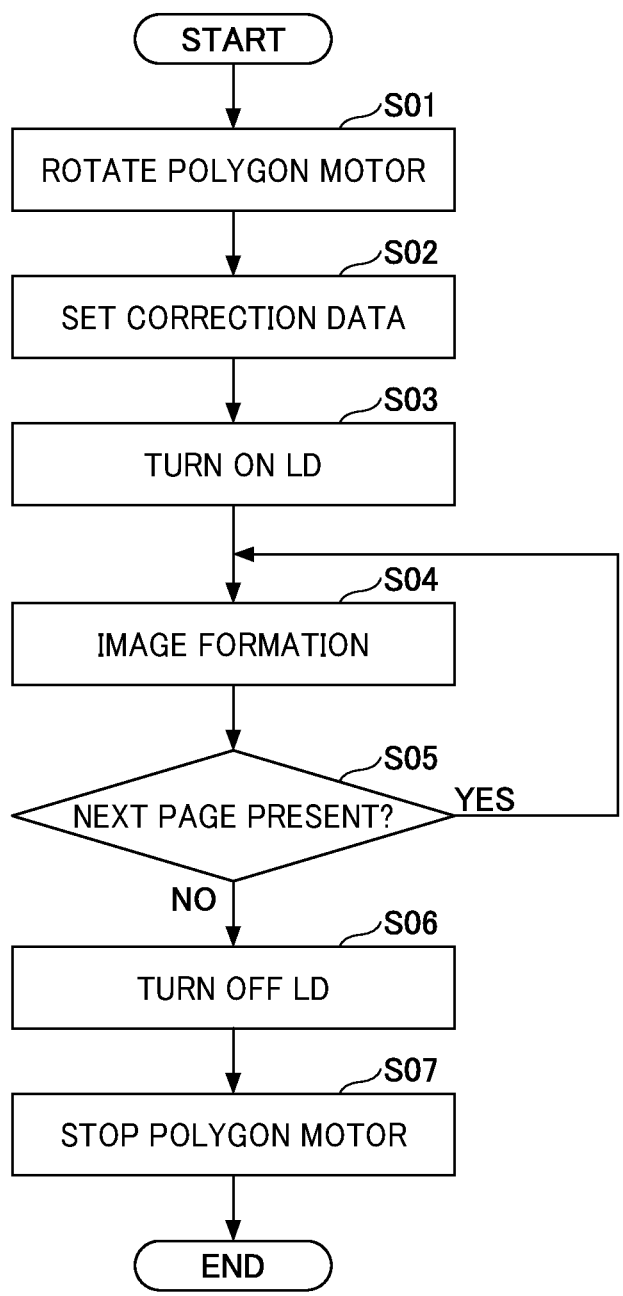
FIG. 14 is a flowchart of an entire process performed by the image forming apparatus of FIG. 1.

Referring now to FIG. 14, a description is given of an entire process performed by the image forming apparatus 1000 described above.

FIG. 14 is a flowchart of an example of the entire process performed by the image forming apparatus 1000.

The image forming apparatus 1000 performs the process illustrated in FIG. 14 to form an image, for example. The entire process starts in response to the start button being pressed on the operation panel.

In step S01, the image forming apparatus 1000 rotates the polygon motor. Specifically, in step S01, the polygon motor illustrated in FIG. 5 rotates at a given number or speed according to an instruction from the printer controller 1.

In step S02, the image forming apparatus 1000 sets correction data. Specifically, in step S02, the image forming apparatus 1000 inputs set values that define writing start positions in the main scanning direction and the sub-scanning direction. More specifically, in step S02, the image forming apparatus 1000 sets, e.g., the first set value SET1 illustrated in FIG. 7 and the second set value SET2 illustrated in FIG. 7.

In step S03, the image forming apparatus 1000 turns on the LD. Specifically, in step S03, the image forming apparatus 1000 performs an auto power control (APC) such that each LD emits a given amount of light, to output, e.g., a synchronization detection signal XDETP illustrated in FIG. 5.

In step S04, the image forming apparatus 1000 performs image formation on a per page basis, for example.

In step S05, the image forming apparatus 1000 determines whether a next page is present.

When the image forming apparatus 1000 determines that the next page is present (YES in step S05), the image forming apparatus 1000 returns to step S04. On the other hand, when the image forming apparatus 1000 determines that the next page is not present (NO in step S05), the image forming apparatus 1000 proceeds to step S06.

In step S06, the image forming apparatus 1000 turns off the LD.

In step S07, the image forming apparatus 1000 stops the polygon motor.

Figure 15:
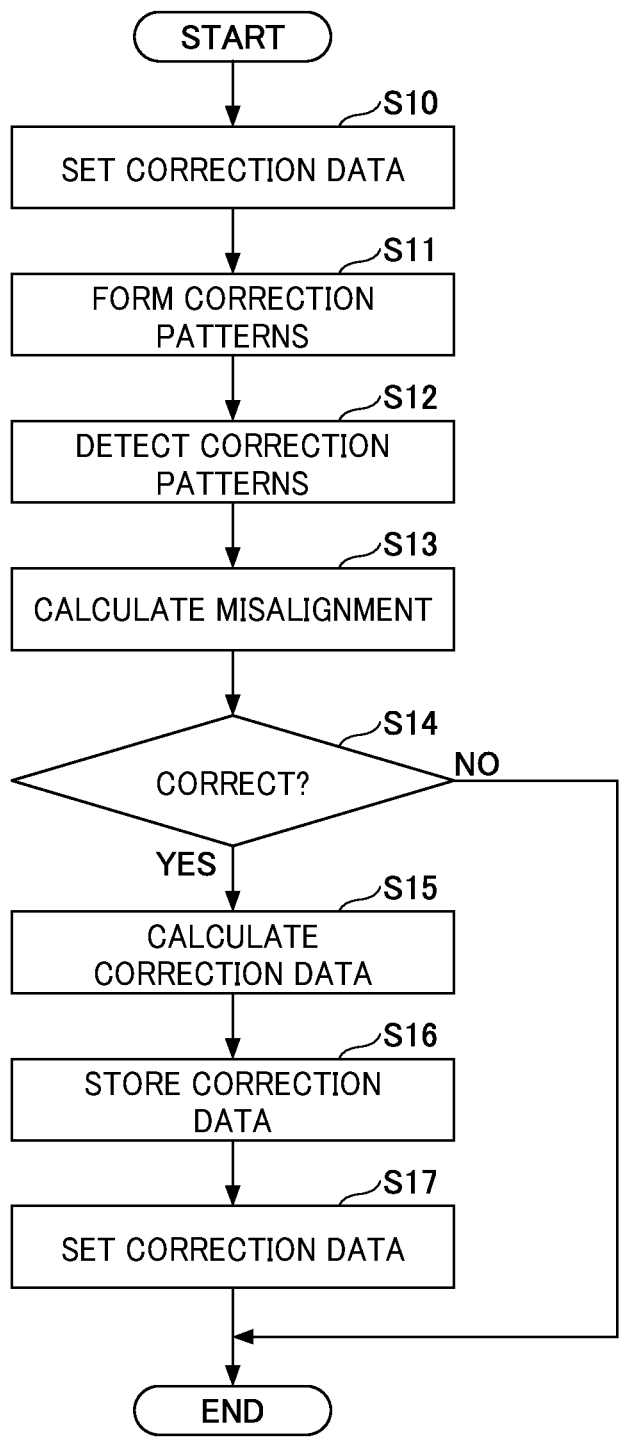
FIG. 15 is a flowchart of a control and correction process performed by the image forming apparatus of FIG. 1.

Referring now to FIG. 15, a description is given of a control and correction process performed by the image forming apparatus 1000 described above.

FIG. 15 is a flowchart of an example of the control and correction process performed by the image forming apparatus 1000.

The image forming apparatus 1000 performs the process illustrated in FIG. 15 when a given number of recording media P are printed, when a measured temperature changes by a given level or greater, when printing starts, when the power is turned on, or in response to an instruction from the printer controller 1 or a user instruction through the operation panel, for example.

In step S10, the image forming apparatus 1000 sets correction data. Note that the image forming apparatus 1000 may skip the step S10 when the image forming apparatus 1000 sets correction data in advance at the time of power-on, for example.

In step S11, the image forming apparatus 1000 forms correction patterns. For example, the image forming apparatus 1000 forms the correction patterns illustrated in FIG. 11 to form full-color images.

In step S12, the image forming apparatus 1000 detects the correction patterns. For example, in the case of FIG. 11, the image forming apparatus 1000 detects the correction patterns with the first sensor SEN1 and the second sensor SEN2.

In step S13, the image forming apparatus 1000 calculates misalignment.

In step S14, the image forming apparatus 1000 determines whether to correct the misalignment. Specifically, in step S14, the image forming apparatus 1000 determines whether to correct the misalignment, based on the misalignment in relation to a reference color calculated in step S13. More specifically, the image forming apparatus 1000 determines to correct the misalignment when the misalignment is equal to or greater than a predetermined value. The predetermined value is, e.g., half a correction resolution.

When the image forming apparatus 1000 determines to correct the misalignment (YES in step S14), the image forming apparatus 1000 proceeds to step S15. On the other hand, when the image forming apparatus 1000 determines not to correct the misalignment (NO in step S14), the image forming apparatus 1000 ends the process. That is, when the image forming apparatus 1000 determines not to correct the misalignment, the image forming apparatus 1000 does not update the correction data. The image forming apparatus 1000 performs a subsequent image forming operation based on data preset at the time of power-on or the like.

In step S15, the image forming apparatus 1000 calculates correction data. Specifically, in step S15, the image forming apparatus 1000 calculates correction data based on the misalignment calculated in step S13.

In step S16, the image forming apparatus 1000 stores the correction data calculated. That is, in step S16, the image forming apparatus 1000 updates the correction data. In a power-on state, the set values are updated according to the correction data. However, when the power is turned off, the set values are often cleared. The image forming apparatus 1000 stores the correction data to retrieve the updated (i.e., latest) set values when the power is turned on after being turned off. Thus, the set values reflect the correction data calculated in step S15 in a power-on state even after the power is turned off.

In step S17, the image forming apparatus 1000 sets the correction data.

Note that the correction data indicates, e.g., a set value for determining the pixel clock frequency that determines the magnification in the main scanning direction, a set value for determining the position in the main scanning direction, and a set value for determining the position in the sub-scanning direction. Specifically, the correction data indicates, e.g., set values of the main scanning control signal XRGATE and the sub-scanning control signal XFGATE illustrated in FIG. 7.

As described above, according to the present embodiment, the misalignment is calculated, for correction, with a reference correction pattern formed by the imaging unit 20U positioned at the holder 20A5 and transferred onto the intermediate transfer belt 10. This is because of unchanged relative positions of the imaging unit 20U disposed in the holder 20A5 and the light beam scanner 21 for the holder 20A5.

Although the holder 20A5 has been described as a representative example of the reference, the reference is not limited to the holder 20A5. Alternatively, any one of the holders 20A1 to 20A4 may be designated as the reference. That is, the misalignment may be calculated, for correction, with a reference correction pattern formed by the imaging unit 20U positioned at any one of the holders 20A1 to 20A4 and transferred onto the intermediate transfer belt 10.

In a case in which a specific-color correction pattern formed by the imaging unit 20U for the specific color and transferred onto the intermediate transfer belt 10 is used as a reference for misalignment calculation and correction, the specific-color correction pattern may be formed at a different position when the imaging units 20U for the specific color and another color are interchanged. Such a positional change of the reference correction pattern may also change the calculation way so as to use the correction pattern formed by the imaging unit 20U for the specific color as the reference.

By contrast, according to the present embodiment, a correction pattern formed by the imaging unit 20U positioned at a specific holder (i.e., any one of the holders 20A1 to 20A5) and transferred onto the intermediate transfer belt 10 is used as a reference for misalignment calculation and correction. Accordingly, the way of calculation and correction is unchanged regardless of the color of the reference correction pattern.

According to the embodiments of the present disclosure, the imaging units 20U are interchangeable in the image forming unit 100. Such a configuration facilitates correction of magnification and image misalignment in the main scanning direction and the sub-scanning direction in the image forming apparatus 1000.

In the image forming unit 100 of the image forming apparatus 1000, the holder 20A5 is located at the most downstream position of the five holding positions in the rotation direction RD of the intermediate transfer belt 10. The imaging unit 20U positioned at the holder 20A5 is an imaging unit for a background color of an image to be formed on a recording medium P such as a plastic sheet. In short, the imaging unit 20U positioned at the holder 20A5 forms a background image.

Therefore, the misalignment between an image of the background color and an image of a color other than the background color is corrected with the holder 20A5 designated as a reference. As a consequence, a final image is arranged on the basis of the background image.

According to the embodiment described above, each of the five imaging units 20U includes the cleaner 13, the charger 18, the discharger 19, the developing device 29, and the photoconductor 40. The five holders 20A1 to 20A5 hold the five imaging units 20U such that the five imaging units 20U are interchangeable.

Alternatively, the imaging units 20U may be interchanged on a component basis. Specifically, the developing devices 29 may be interchanged together with the photoconductors 40. The developing device 29 and the photoconductor 40 of the imaging unit 20U are components associated with a particular color. Therefore, mixture of colors is prevented by interchanging the developing devices 29 together with the photoconductors 40. That is, the cleaners 13, the chargers 18, and the dischargers 19 are fixed at particular locations thereof, without being interchanged.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by an application-specific integrated circuit (ASIC), prepared by interconnecting an appropriate network of conventional component circuits or by a combination thereof with one or more conventional general-purpose microprocessors and/or signal processors programmed accordingly.

What is claimed is:

1. An image forming apparatus comprising:
    a plurality of image forming devices corresponding to a plurality of colors, the plurality of image forming devices including a plurality of image bearers;
    a plurality of image output devices configured to form a plurality of latent pattern images aligned in an image conveyance direction on the plurality of image bearers, the plurality of image forming devices configured to form a plurality of visible pattern images aligned in the image conveyance direction from the plurality of latent pattern images, such that each image forming device of the plurality of image forming devices forms at least one visible pattern of the plurality of visible pattern images aligned in the image conveyance direction;
    an endless conveyor;
    a transfer device to transfer the plurality of visible pattern images from the plurality of image bearers onto the endless conveyor;
    the endless conveyor configured to convey the plurality of visible pattern images in the image conveyance direction;
    a plurality of holders to hold the plurality of image forming devices interchangeable at a plurality of holding positions aligned in the image conveyance direction, the plurality of holding positions including a specific holding position;
    a detector configured to detect the plurality of visible pattern images on the endless conveyor; and
    circuitry configured to compare a first visible pattern image of the plurality of visible pattern images with a plurality of second visible pattern images of the plurality of visible pattern images, the first and second visible pattern images all being aligned in the image conveyance direction, to correct misalignment between the first visible pattern image and the plurality of second visible pattern images,
    the first visible pattern image being formed by one image forming device of the plurality of image forming devices held at the specific holding position and transferred onto the endless conveyor, the first visible pattern image including a horizontal first pattern image extending perpendicular to the image conveyance direction and an oblique first pattern image extending obliquely to the image conveyance direction,
    the plurality of second visible pattern images being formed by a plurality of separate image forming devices, other than the one image forming device, of the plurality of image forming devices held at other holding positions of the plurality of holding positions and transferred onto the endless conveyor such that the plurality of second visible pattern images are all aligned with the first visible pattern image in the image conveyance direction, each second visible pattern image including a horizontal second pattern image extending perpendicular to the image conveyance direction and an oblique second pattern image extending obliquely to the image conveyance direction, wherein the horizontal first pattern image, the horizontal second pattern images, the oblique first pattern image, and the oblique second pattern images are all aligned with each other in the image conveyance direction, wherein the comparing includes, for each separate image forming device other than the one image forming device, determining a magnification and image position error of a second visible pattern image formed by the separate image forming device in a main scanning direction based on a determined difference between a first time interval and a time interval between detection of the oblique first pattern image and an oblique second pattern image of the second visible pattern image by the detector, and determining an image position error of the second visible pattern image formed by the separate image forming device in a sub-scanning direction based on a determined difference between a second time interval and a time interval between detection of the horizontal first pattern image and a horizontal second pattern image of the second visible pattern image by the detector.

2. The image forming apparatus according to claim 1, wherein the specific holding position is a most downstream position of the plurality of holding positions in the image conveyance direction.

3. The image forming apparatus according to claim 1, wherein the plurality of image output devices are configured to form a plurality of sets of latent pattern images in the image conveyance direction and the plurality of image forming devices are configured to form a plurality of sets of visible pattern images from the plurality of sets of latent pattern images, wherein the detector is configured to detect the plurality of sets of visible pattern images aligned in the image conveyance direction on the endless conveyor, wherein the plurality of sets of visible pattern images includes a plurality of sets of the first visible pattern image and the plurality of second visible pattern images, and wherein the circuitry is configured to calculate the misalignment for each of the plurality of sets of visible pattern images to obtain an average and correct the misalignment with the average.

4. The image forming apparatus according to claim 1, wherein the plurality of holding positions and the plurality of image forming devices include five holding positions and five image forming devices, respectively, for white, yellow, magenta, cyan, and black, such that the first visible pattern image is one color of white, yellow, magenta, cyan, or black, and the plurality of second visible pattern images aligned with the first visible pattern image in the image conveyance direction include four visible pattern images that are each a separate color of white, yellow, magenta, cyan, or black that is other than the one color.

5. The image forming apparatus according to claim 1, wherein the plurality of image forming devices further includes a plurality of developing devices being interchangeable between the plurality of holding positions.

6. An image forming apparatus comprising:

a plurality of image forming devices corresponding to a plurality of colors, the plurality of image forming devices including a plurality of image bearers;

a plurality of image output devices configured to form two sets of latent pattern images extending in parallel with each other in an image conveyance direction on the plurality of image bearers, the plurality of image forming devices configured to form two sets of visible pattern images aligned in the image conveyance direction and in parallel with each other from the two sets of latent pattern images, such that each image forming device of the plurality of image forming devices forms at least two visible patterns that are in separate sets of the two sets of visible pattern images and are aligned orthogonally to the image conveying direction with each other;

an endless conveyor;

a transfer device to transfer the two sets of visible pattern images from the plurality of image bearers onto the endless conveyor;

the endless conveyor configured to convey the two sets of visible pattern images in the image conveyance direction;

a plurality of holders to hold the plurality of image forming devices interchangeable at a plurality of holding positions aligned in the image conveyance direction, the plurality of holding positions including a specific holding position;

a detector configured to detect the two sets of visible pattern images on the endless conveyor, the detector including two sensors each configured to detect a separate set of visible pattern images aligned in the image conveyance direction; and circuitry configured to compare separate first visible pattern images, formed in separate sets of the two sets of visible pattern images and aligned orthogonally to the image conveyance direction, by a same first image forming device of the plurality of image forming devices, with corresponding second visible pattern images formed in separate sets of the two sets of visible pattern images and aligned orthogonally to the image conveyance direction by another, same second image forming device of the plurality of image forming devices, to determine two, separate misalignment determinations associated with the second image forming device, the second image forming device being separate from the first image forming device, and compare the two, separate misalignment determinations to determine a misalignment of visible pattern images formed by the second image forming device, wherein the first image forming device is held at the specific holding position of the plurality of holding positions and the second image forming device is held at another holding position of the plurality of holding positions.

7. The image forming apparatus according to claim 6, wherein the specific holding position is a most downstream position of the plurality of holding positions in the image conveyance direction.

8. The image forming apparatus according to claim 6, wherein the determined misalignment of visible pattern images formed by the second image forming device is one of a misalignment of visible pattern images formed by the second image forming device due to a magnification error, a misalignment of visible pattern images formed by the second image forming device in a main scanning direction, or a misalignment of visible pattern images formed by the second image forming device in a sub-scanning direction.

9. The image forming apparatus according to claim 6, wherein the plurality of holding positions and the plurality of image forming devices include five holding positions and five image forming devices, respectively, for white, yellow, magenta, cyan, and black, such that the separate first visible pattern images are one color of white, yellow, magenta, cyan, or black, and the separate second visible pattern images are each a separate color of white, yellow, magenta, cyan, or black that is other than the one color.

10. The image forming apparatus according to claim 6, wherein the plurality of image forming devices further includes a plurality of developing devices being interchangeable between the plurality of holding positions.

\* \* \* \* \*